United States Patent
Zhang et al.

(10) Patent No.: US 11,301,200 B2
(45) Date of Patent: Apr. 12, 2022

(54) METHOD OF PROVIDING ANNOTATION TRACK ON THE CONTENT DISPLAYED ON AN INTERACTIVE WHITEBOARD, COMPUTING DEVICE AND NON-TRANSITORY READABLE STORAGE MEDIUM

(71) Applicants: GUANGZHOU SHIYUAN ELECTRONICS CO., LTD., Guangdong (CN); GUANGZHOU SHIZHEN INFORMATION TECHNOLOGY CO., LTD., Guangdong (CN)

(72) Inventors: Weiyuan Zhang, Guangdong (CN); Wei Li, Guangdong (CN)

(73) Assignees: GUANGZHOU SHIYUAN ELECTRONICS CO., LTD., Guangdong (CN); GUANGZHOU SHIZHEN INFORMATION TECHNOLOGY CO. LTD., Guangdong (CN)

( * ) Notice: Subject to any disclaimer, the term of this patent is extended or adjusted under 35 U.S.C. 154(b) by 0 days.

(21) Appl. No.: 16/932,572

(22) Filed: Jul. 17, 2020

(65) Prior Publication Data
US 2020/0348900 A1 Nov. 5, 2020

Related U.S. Application Data

(63) Continuation of application No. PCT/CN2018/115960, filed on Nov. 16, 2018.

(51) Int. Cl.
G06F 3/14 (2006.01)
G06F 40/171 (2020.01)
(Continued)

(52) U.S. Cl.
CPC ......... *G06F 3/1462* (2013.01); *G06F 3/0483* (2013.01); *G06F 40/169* (2020.01); *G06F 40/171* (2020.01)

(58) Field of Classification Search
None
See application file for complete search history.

(56) References Cited

U.S. PATENT DOCUMENTS 7,373,590 B2 * 5/2008 Woolf ............. G06Q 10/10 715/230
10,114,810 B2 * 10/2018 Raleigh ............ G06Q 10/101
(Continued)

FOREIGN PATENT DOCUMENTS

CN 103049247 A 4/2013
CN 103984512 A 8/2014
(Continued)

OTHER PUBLICATIONS

International Application No. PCT/CN2018/115960, International Search Report dated Jan. 30, 2019, 2 pages.
(Continued)

*Primary Examiner* — Howard Cortes
(74) *Attorney, Agent, or Firm* — Zhong Law, LLC

(57) ABSTRACT

The present document discloses an the method of providing annotation track on the content displayed on an interactive whiteboard, an apparatus, a device, and a storage medium. The method of providing annotation track includes: displaying screen sharing data; displaying an annotation track, where the annotation track is generated based on an annotation command or a touch operation; controlling the annotation track to change synchronously with a change of corresponding screen sharing data on a display interface.

20 Claims, 20 Drawing Sheets

(51) Int. Cl.
*G06F 40/169* (2020.01)
*G06F 3/0483* (2013.01)

(56) References Cited

U.S. PATENT DOCUMENTS

| | | | | |
|---|---|---|---|---|
| 10,503,797 | B2* | 12/2019 | Hoshino | G06F 3/0484 |
| 2003/0117378 | A1* | 6/2003 | Carro | G06F 3/04883 |
| | | | | 345/173 |
| 2004/0237033 | A1 | 11/2004 | Woolf et al. | |
| 2006/0174193 | A1* | 8/2006 | Kikuchi | G06F 40/137 |
| | | | | 715/255 |
| 2006/0218171 | A1* | 9/2006 | Wakeam | G06K 9/00463 |
| 2007/0024812 | A1 | 2/2007 | Chung et al. | |
| 2009/0132907 | A1* | 5/2009 | Shao | G06F 40/14 |
| | | | | 715/234 |
| 2011/0258527 | A1* | 10/2011 | Woolf | G06F 16/9558 |
| | | | | 715/230 |
| 2013/0318465 | A1* | 11/2013 | Cheng | G06Q 10/101 |
| | | | | 715/776 |
| 2014/0006921 | A1* | 1/2014 | Gopinath | G06Q 10/10 |
| | | | | 715/230 |
| 2014/0281875 | A1* | 9/2014 | Branton | G06F 40/169 |
| | | | | 715/230 |
| 2014/0344090 | A1* | 11/2014 | Herring | G06Q 30/0238 |
| | | | | 705/24 |
| 2014/0344662 | A1* | 11/2014 | Isabel | G06F 3/04883 |
| | | | | 715/230 |
| 2014/0380193 | A1* | 12/2014 | Coplen | G06F 3/04847 |
| | | | | 715/753 |
| 2015/0033110 | A1* | 1/2015 | Park | G06F 40/169 |
| | | | | 715/230 |
| 2015/0095798 | A1 | 4/2015 | Yang et al. | |
| 2016/0117067 | A1* | 4/2016 | Ghosh | G06F 15/0291 |
| | | | | 715/753 |
| 2017/0060829 | A1* | 3/2017 | Bhatt | G06F 40/134 |
| 2017/0249294 | A1 | 8/2017 | Emori | |

FOREIGN PATENT DOCUMENTS

| | | |
|---|---|---|
| CN | 104298655 A | 1/2015 |
| CN | 104462039 A | 3/2015 |
| CN | 104484320 A | 4/2015 |
| CN | 104794106 A | 7/2015 |
| CN | 105573702 A | 5/2016 |
| CN | 106776514 A | 5/2017 |
| CN | 107066528 A | 8/2017 |
| CN | 107193794 A | 9/2017 |
| CN | 107454433 A | 12/2017 |
| CN | 104731443 B | 5/2018 |
| CN | 108241480 A | 7/2018 |
| CN | 108459836 A | 8/2018 |
| CN | 105446689 B | 12/2018 |
| CN | 106681624 B | 12/2019 |
| CN | 107341137 B | 4/2020 |
| TW | 200705989 A | 2/2007 |

OTHER PUBLICATIONS

Chinese Application No. 201810234425.7, Second Office Action 7 pages.
European Application No. 18901175.2, Extended European Search Report dated Feb. 3, 2021, 7 pages.

* cited by examiner

METHOD OF PROVIDING ANNOTATION TRACK ON THE CONTENT DISPLAYED ON AN INTERACTIVE WHITEBOARD, COMPUTING DEVICE AND NON-TRANSITORY READABLE STORAGE MEDIUM

RELATED APPLICATIONS

The present disclosure is a continuation application of PCT/CN2018/115960 filed on Nov. 16, 2018, which claims priority to Chinese patent application No. 201810234425.7, filed with China National Intellectual Property Administration on Mar. 21, 2018, and Chinese patent application No. 201810054748.8 filed with China National Intellectual Property Administration on Jan. 19, 2018. All of the aforementioned applications are hereby incorporated by reference in their entireties.

TECHNICAL FIELD

The present disclosure relates to the field of interactive whiteboard technology, for example, to a method, computing device and non-transitory readable storage medium of providing annotation track on the content displayed on an interactive whiteboard.

BACKGROUND

In the field of interactive whiteboards, the screen sharing technology as one of the important applications of the interactive whiteboards has a broad range of applications in people's work and study because it can greatly improve the efficiency of people's work and study. For example, in a conference scenario, a user can share the content displayed on the laptop computer that he/she is operating onto an interactive whiteboard, so that other participants can view the content through the interactive whiteboard. By such sharing, the participants can efficiently participate in the conference and decision making.

However, during the above-mentioned screen sharing, the displayed content of screen sharing cannot be annotated on the interactive whiteboard displaying the sharing data. Such operation must be performed on the end device that generates the screen sharing data, causing poor user experience.

SUMMARY

This summary is provided to introduce a selection of embodiments in a simplified form that are further described below in the Detailed Description. This summary is not intended to exclusively identify key features or essential features of the claimed subject matter, nor is it intended as an aid in determining the scope of the claimed subject matter.

The method of providing annotation track on the content displayed on an interactive whiteboard provided in this embodiment may be performed by an annotation displaying device. The annotation displaying device may be a computer, a mobile phone, a tablet, a projector, an interactive whiteboard or the like. In an embodiment, the annotation displaying device is described by taking an interactive whiteboard as an example. In an embodiment, the interactive whiteboard may be an integrated device that manipulates the content displayed on a display panel through touch technologies and realizes human-computer interactive operations. The interactive whiteboard establishes a data connection with at least one external apparatus. In an embodiment, the external apparatus includes, but is not limited to: a mobile phone, a laptop computer, a universal serial bus (Universal Serial Bus, USB) flash drive, a tablet computer, a desktop computer and the like.

According to some embodiments, the interactive whiteboard can display a first content of screen sharing, and the first content of screen sharing is received by one external apparatus. The interactive whiteboard can receive a first annotation command, wherein the first annotation command is used for annotating the first content of screen sharing; and then display a first annotation track above the first content of screen sharing on the display panel. The interactive whiteboard can receive a request to turn pages forward, wherein the request to turn pages forward is used for triggering the first content of screen sharing to turn forward; and then a second content of screen sharing are displayed on the display panel after implementing the request. The interactive whiteboard can receive an input to turn pages backward, wherein the input is used for controlling the second content of screen sharing to turn backward to the first content of screen sharing; then the first content of screen sharing and the first annotation track can be displayed on the display panel after implementing the input.

Other embodiments are directed to computing device, and non-transitory readable storage medium associated with methods described herein.

A better understanding of the nature and advantages of embodiments of the present invention may be gained with reference to the following detailed description and the accompanying drawings.

DESCRIPTION OF EMBODIMENTS

Figure 1:
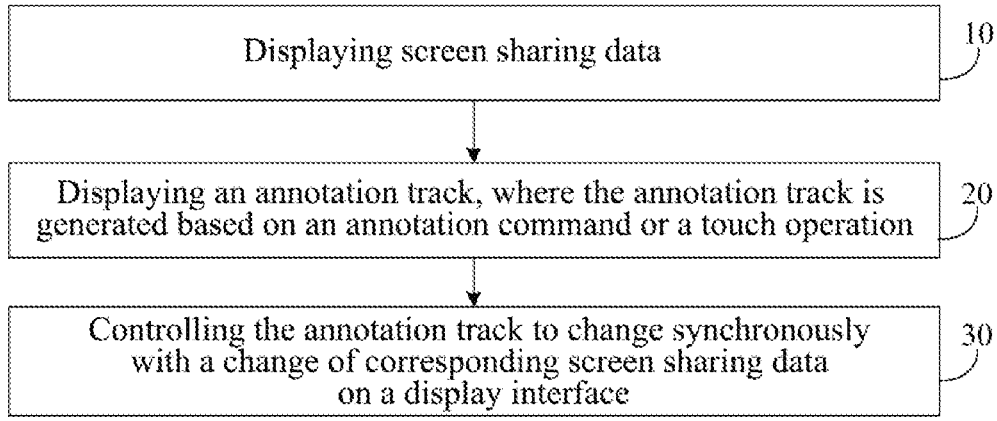
FIG. 1 is a flowchart of a method of providing annotation track on the content displayed on an interactive whiteboard provided in an embodiment of the disclosure.

The disclosed embodiments will be described below with reference to the drawings and embodiments. The specific embodiments described herein are only used to explain the present disclosure, rather than to limit the present disclosure. In addition, for the convenience of description, only the parts related to the present disclosure, instead of all contents, are shown in the drawings.

Embodiment I

FIG. 1 is a flowchart of a method of providing annotation track on the content displayed on an interactive whiteboard provided in an embodiment of the disclosure.

The method of providing annotation track on the content displayed on an interactive whiteboard provided in this embodiment may be performed by an annotation displaying device, which may be implemented by means of software and/or hardware. The annotation displaying device may include two or more physical entities, or one physical entity. The annotation displaying device may be a computer, a mobile phone, a tablet, a projector, an interactive whiteboard or the like. In this embodiment, the annotation displaying device is described by taking an interactive whiteboard as an example. In an embodiment, the interactive whiteboard may be an integrated device that manipulates the content displayed on a display panel through touch technologies, thereby realizing human-computer interactive operations. The interactive whiteboard integrates one or more functions of a projector, an electronic whiteboard, a curtain, audio equipment, a TV, a video conference terminal and the like.

Embodiments of the interactive whiteboard may establish a data connection with at least one external apparatus. In an embodiment, the external apparatus includes, but is not limited to: a mobile phone, a laptop computer, a universal serial bus (Universal Serial Bus, USB) flash drive, a tablet computer, a desktop computer and the like. The communication manner for the data connection between the external apparatus and the interactive whiteboard may be, but not limited by, realized by means of a USB connection, the Internet, a local area network, Bluetooth, wireless-fidelity (Wireless-fidelity, Wi-Fi), ZigBee protocol (ZigBee) or other communication manners.

In an embodiment, when data interaction occurs between the interactive whiteboard and at least one external apparatus, the external apparatus may send screen sharing data to the interactive whiteboard so that the interactive whiteboard can display the screen sharing content of the screen sharing data as a screen sharing client. In an embodiment, there may be one or more screen sharing clients provided according to specific application scenarios. This disclosure does not limit the number of screen sharing clients in its embodiments.

In an embodiment, screen sharing application software is installed in the screen sharing client and/or interactive whiteboard, where the screen sharing application software may be pre-installed in the above screen sharing client and/or interactive whiteboard, or may be downloaded from a third-party device or a server and installed for use when the screen sharing client and/or interactive whiteboard starts the screen sharing application. The third-party device is not limited those described in the disclosure. In an embodiment, the screen sharing application software obtains the content displayed on the screen sharing client, and using the content displayed on the screen sharing client as the screen sharing data, instructs the interactive whiteboard to display the content. In this embodiment, an example in which the screen sharing application software is installed in both the screen sharing client and the interactive whiteboard will be described. In an embodiment, the screen sharing application software of the screen sharing client is used to obtain the screen sharing data and send the screen sharing data directly or indirectly to the interactive whiteboard. If the screen sharing data is sent indirectly, the screen sharing client may transmit the screen sharing data to the interactive whiteboard through a transfer device which may be a wireless screen transmission apparatus or other apparatuses with data transferring/processing functions. The screen sharing application software of the interactive whiteboard is used to receive the screen sharing data and convert the screen sharing data into corresponding content which is suitable for the interactive whiteboard to display. In an embodiment, the resolution of the display screen of the screen sharing client is different from that of the display screen of the interactive whiteboard, and the screen sharing data is obtained based on the resolution of the screen sharing client; therefore, in order to display the screen sharing data on the display screen of the interactive whiteboard, the screen sharing application software may determine a screen mapping relation in accordance with the resolution of the display screen of the screen sharing client and the resolution of the display screen of the interactive whiteboard, and then convert the screen sharing data in accordance with the screen mapping relation so as to obtain the content of screen sharing. In an embodiment, the content of screen sharing is substantially the same as the display content of the screen sharing data except for the only resolutions.

In an embodiment, the screen sharing data is in a picture format, and the screen sharing data may be screenshot data obtained by taking a screenshot of the display content of the screen sharing client, or may be a presentation in the Microsoft® Office PowerPoint (Microsoft Office PowerPoint, PPT) format.

In this embodiment, the present disclosure will be described through an example in which the screen sharing client is a laptop computer, the screen sharing data is a PPT in the slide show state, and the laptop computer interacts with the interactive whiteboard.

As shown in FIG. 1, the method of providing the method of providing annotation track on the content displayed on an interactive whiteboard provided in this embodiment includes the following steps.

Step 10: displaying screen sharing data.

In an embodiment, the screen sharing data is received from other devices.

Step 20: displaying an annotation track, where the annotation track is generated based on an annotation command or a touch operation.

Step 30: controlling the annotation track to change synchronously with a change of corresponding screen sharing data on a display interface.

The method of providing annotation track on the content displayed on an interactive whiteboard provided in this embodiment may realize that the screen sharing data is annotated on an end device displaying the screen sharing data in a screen sharing scenario, and meanwhile ensure that the annotation changes synchronously with the change of the screen sharing data, thereby improving the user's experience.

In an embodiment, the displaying the screen sharing data further includes: receiving a command to display content of screen sharing; displaying a first content of screen sharing. The displaying the annotation track includes: receiving a first annotation command, wherein the first annotation command is used for annotating the first content of screen sharing; displaying a first annotation track on the first content of screen sharing, wherein the first annotation track is generated based on the first annotation command After displaying the first annotation track, the method further includes: detecting a request to turn pages forward, wherein the request to turn pages forward is used for triggering the first content of screen sharing to turn forward; displaying a second content of screen sharing after performing the request. The controlling the annotation track to change synchronously with the change of the corresponding screen sharing data on the display interface includes: detecting an input to turn pages backward, wherein the input is used for controlling the second content of screen sharing to turn backward to the first content of screen sharing; displaying the first content of screen sharing and the first annotation track after implementing the input.

Figure 2:
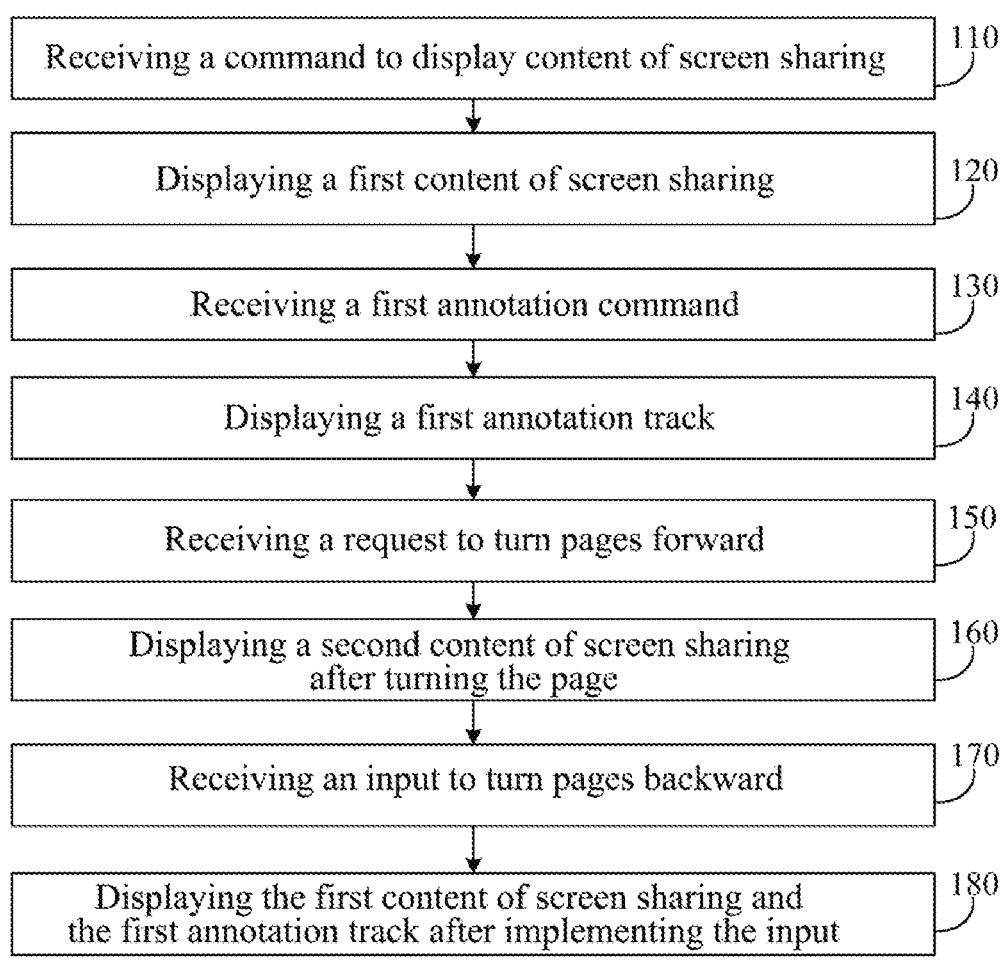
FIG. 2 is a flowchart of a method of providing annotation track on the content displayed on an interactive whiteboard provided in another embodiment of the disclosure.

FIG. 2 is a flowchart of a method of providing annotation track on the content displayed on an interactive whiteboard provided in another embodiment of the disclosure. Referring to FIG. 2, the method of providing annotation track on the content displayed on an interactive whiteboard provided in this embodiment includes the following steps.

Step 110: receiving a command to display content of screen sharing.

In an embodiment, the command to display the content of screen sharing is used to instruct the interactive whiteboard to display the content of screen sharing. The specific command form of the command to display content of screen sharing may be set according to actual application situations. For example, the interactive whiteboard may receive a command to display the content of screen sharing when the interactive whiteboard detects the launch of the screen sharing application software. In another example, the interactive whiteboard may receive a command to display the content of screen sharing when the interactive whiteboard receives the screen sharing data. In another example, a trigger button is provided, where the trigger button may be a physical button or a virtual button that is located on the interactive whiteboard or the laptop computer. In the case that the screen sharing data needs to be transferred through a wireless screen transmission apparatus, the trigger button may also be located on the wireless screen transmission apparatus. When a trigger condition is satisfied, for example, when the interactive whiteboard detects that the trigger button is clicked, double-clicked, long-pressed or the like, the interactive whiteboard confirms the receipt of the command to display the content of screen sharing.

Step 120: displaying a first content of screen sharing.

In an embodiment, the first content of screen sharing is the displayed content after the interactive whiteboard processes first screen sharing data, where the first screen sharing data comes from the laptop computer. In an embodiment, the first screen sharing data is the data generated by the screen sharing application software taking a screenshot of the content displayed on the laptop computer. After receiving the first screen sharing data, the interactive whiteboard decodes the first screen sharing data to obtain the specific display content, and converts the resolution of the display content to obtain the first content of screen sharing that satisfies the resolution of the display screen of the interactive whiteboard. In an embodiment, a manner of performing resolution conversion on the first screen sharing data is to perform pixel point mapping for the first screen sharing data according to a screen mapping relation. For example, the resolution of the display screen of the laptop computer is 320×240, and the resolution of the display screen of the interactive whiteboard is 640×480. In this scenario, the screen sharing relation is that the pixel value of one pixel point in the display screen of the laptop computer is displayed at four pixel points located at the corresponding position in the display screen of the interactive whiteboard. According to this, the interactive whiteboard performs, according to the screen sharing relation, coordinate mapping for the pixel value of each pixel point in the first decoded screen sharing data, so as to obtain the first content of screen sharing. In an embodiment, the pixel value mentioned above may be red, green, blue (Red, Green, Blue, RGB) values. In an embodiment, the pixel values generally do not change during the mapping. The resolution parameters of the display screens mentioned in the above example are only for understanding the technical solution, not at a limitation of, the resolution parameters of the display screens.

In an embodiment, before displaying the first content of screen sharing, the interactive whiteboard has obtained the first screen sharing data. In an embodiment, the sending time of the first screen sharing data can be set according to actual conditions. For example, before or after receiving the command to display content of screen sharing, the laptop computer sends all of the data of the PPT to the interactive whiteboard, so that in the subsequent screen sharing process, the laptop computer only needs to determine the page number of the first screen sharing data and send the page number to the interactive whiteboard, and then the first content of screen sharing corresponding to the page number can be synchronously displayed in the interactive whiteboard. In another example, after receiving the command to display content of screen sharing, the laptop computer may capture screenshots according to the set frequency or captures a screenshot after detecting a change of the page number of the displayed PPT, and sends the first screen sharing data obtained by capturing the screenshot and the corresponding page number to the interactive whiteboard together, so that the interactive whiteboard synchronously displays the corresponding first content of screen sharing, and saves the first content of screen sharing and the associated page number. It is considered that the content on the same PPT page can be variable during a show in the actual situation. For example, a text box in the current page of the PPT is set to be erased by a click, and another text box is displayed synchronously at the same position during the erasing; at this time, although the page number of the PPT is not changed, the displayed content is changed. Therefore, in such a case, in order to ensure that the interactive whiteboard accurately displays the first content of screen sharing, it may also be set that the laptop computer obtains the first screen sharing data by capturing screenshots according to the set frequency and sends the same to the interactive whiteboard when determining that the PPT page number is not changed but the displayed content is changed, so that the interactive whiteboard synchronously displays the changing process of the first content of screen sharing.

Step 130: receiving a first annotation command.

In an embodiment, the display screen of the interactive whiteboard is a touch screen which may include: a capacitive display screen, an electromagnetic display screen, an infrared display screen or the like. In an embodiment, the touch screen can receive a touch operation inputted by a user through a finger or an input device. In an embodiment, the input device includes but is not limited to: a stylus pen, an infrared pen, and/or a capacitive pen. In an embodiment, the first annotation command is received via the touch operations operated on the touch screen of the interactive whiteboard.

In an embodiment, the first annotation command is used to annotate the first content of screen sharing. In an embodiment, the method for annotating includes but is not limited to: marking on the first content of screen sharing, for example, drawing a picture, drawing a deleting symbol, writing a text for explanation and the like. In an embodiment, it may be assumed that the first annotation command is generated by default for each touch operation obtained after the interactive whiteboard displays the first content of screen sharing, or the first annotation command is generated for the touch operation obtained after the interactive whiteboard receives an annotation trigger instruction, where the triggering method for the annotation trigger instruction is not limited.

Step 140: displaying a first annotation track.

In an embodiment, the first annotation track is generated based on the first annotation command. In an embodiment, when a user performs a touch operation on the display screen of the interactive whiteboard, a parameter associated with an electronic element at the corresponding position inside the display screen of the interactive whiteboard may change, and a processor of the interactive whiteboard determines the touch position, i.e., the position of an annotation, according to the parameter-changing position(s) associated with the electronic element(s). Taking the capacitive display screen as an example, when the user draws a straight line on the display screen of the interactive whiteboard, the capacitance at the corresponding positions will change sequentially according to the user's writing operation, that is, the first annotation command containing the change in capacitance is generated. The processor can determine the annotation position according to the change in capacitance, and then obtain the corresponding first annotation track.

An embodiment may take into consideration that when the user makes an annotation, the annotating includes not only marking the first content of screen sharing, such as marking a horizontal line under certain text data, or circling parts of the display content, but also making a text annotation on the first content of screen sharing, such as adding an annotation box at a certain position and writing text data into the annotation box. Therefore, in order to satisfy the situation of adding the annotation box, at least one annotation box may be preset, and each annotation box corresponds to a different annotation track. When the first annotation command is received, it is determined whether the first annotation track is the annotation track of the preset annotation box or not; if it is, the preset annotation box is displayed as the first annotation track; if it is not, the annotation track obtained from the first annotation command is displayed as the first annotation track.

In an embodiment, in order to add an annotation to the first content of screen sharing, a display layer is added in the display screen of the interactive whiteboard. thus, there are two display layers in the display screen, for example, the first content of screen sharing is displayed in the first display layer, and the first annotation track is displayed in the second display layer. In an embodiment, the first display layer is a default display layer, and the second display layer is a display layer added under a screen sharing scenario. The second display layer is an interactive layer that receives the user's touch operation, that is, the second display layer is located on the top of the current display interface. In an embodiment, the second display layer can display all contents related to the annotation, such as the first annotation track, an annotation tool box and the like. The user can change the display parameters, such as the color and the line width of the track, through the annotation tool box. Moreover, the first annotation track is editable, and thus the user can change the position, size, shape and other parameters of the first annotation track according to actual requirements.

Figure 3:
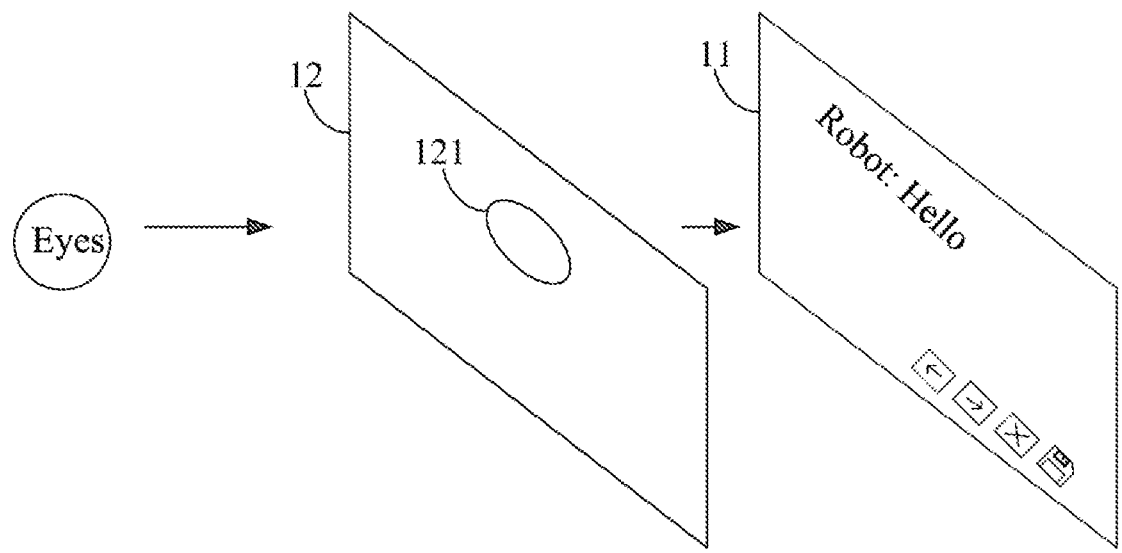
FIG. 3 is a schematic diagram of reference positions of a first display layer and a second display layer provided in an embodiment of the disclosure.

In an embodiment, the second display layer overlays the first display layer, so that the first display layer is completely overlapped with the second display layer. In an embodiment, the second display layer of the interactive whiteboard is provided as having an unfilled format and covering the first display layer, so that the user can view the first content of screen sharing of the first display layer and the first annotation track of the second display layer. At this time, the second display layer may be regarded as a transparent window overlaying on the first content of screen sharing. Referring to FIG. 3, FIG. 3 is a schematic diagram of reference positions of a first display layer and a second display layer provided in an embodiment. In FIG. 3, the second display layer 12 is in an unfilled format and displays the first annotation track 121. The second display layer 12 covers the first display layer 11 and the first content of screen sharing is displayed in the first display layer 11.

Figure 4:
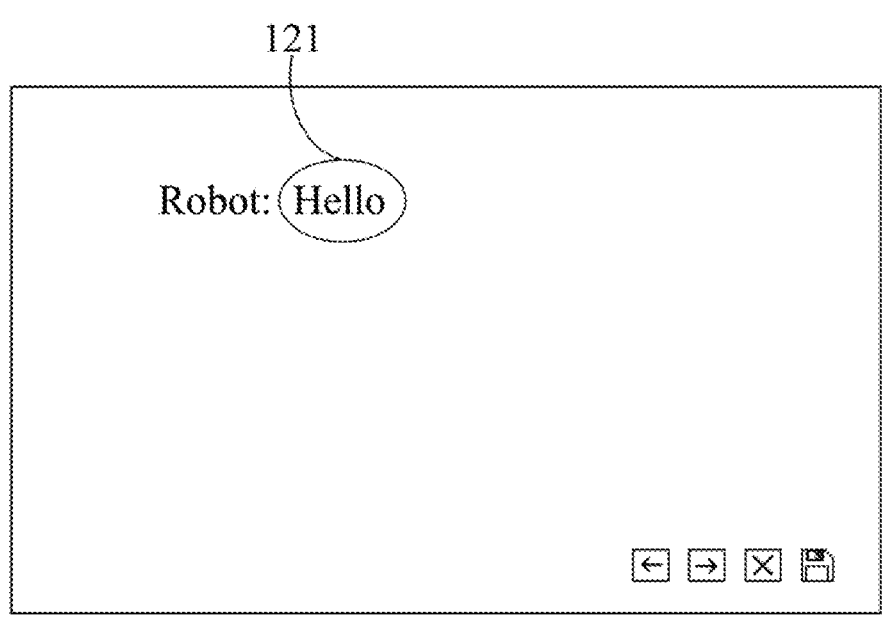
FIG. 4 is a schematic diagram of a display interface viewed from a user's perspective provided in an embodiment of the disclosure.

FIG. 4 is a schematic diagram of a display interface viewed from a user's perspective provided in an embodiment. It can be seen from FIG. 4 that the user can only view the annotation track above the first content of screen sharing, but cannot clearly distinguish the first display layer 11 from the second display layer 12. For ease of understanding, the first display layer and the second display layer are presented separately in FIG. 3; however, in practical applications, the first display layer and the second display layer are in close contact with each other.

Annotating the first content of screen sharing by adding a display layer is only an optional implementation. In actual applications, other implementations can also be used to annotate the first content of screen sharing. For example, a screenshot is captured for the first content of screen sharing to obtain an image, which is then annotated so as to realize the addition of the annotation to the first content of screen sharing. However, no matter which manner is used to implement the annotating, the first content of screen sharing does not include the first annotation track, and the first content of screen sharing and the first annotation track are data independent of each other.

In an embodiment, after displaying the first annotation track, the method further includes: converting the first annotation track in user's handwriting into the annotation track in standard print formats; displaying the annotation track in standard print formats substitute for the first annotation track in user's handwriting. In an embodiment, the first annotation track written by the user is converted into a computer-standard print formats, so that the display interface looks more pleasant.

Step 150: receiving a request to turn pages forward.

In an embodiment, the request to turn pages forward is used to control the page number of the PPT to change, and control the first content of screen sharing to be turned forward. For example, if the current first content of screen sharing is the content of page 5 of the PPT, the request to turn pages forward is used to control the first content of screen sharing to be turned forward, so that the interactive whiteboard and laptop computer display the content of page 6 of the PPT. In an embodiment, the instruction form of the request to turn pages forward can be set according to actual conditions. For example, a page turning button is provided, and the page turning button may be a physical button or a virtual button; or a page up touch operation is set, such as a single or multi-touch on a set area, or sliding along a set direction or the like. Upon detecting that the page turning button is clicked or a page up touch operation is received, it is determined that the request to turn pages forward is received.

In an embodiment, the user can give a request to turn pages forward through any one or more of the interactive whiteboard, laptop computer, and input device. When the user issues a request to turn pages forward through the interactive whiteboard or the input device, the interactive whiteboard forwards the request to turn pages forward to the laptop computer, so that the laptop computer executes the request to turn pages forward. In an embodiment, when forwarding the request to turn pages forward, the interactive whiteboard may employ a transparent transmission manner, or may process the request to turn pages forward to convert it into an instruction form recognizable by the laptop computer.

In an embodiment, when receiving the request to turn pages forward, regardless of the current display content being the first content of screen sharing or not, the interactive whiteboard controls by default the current content of screen sharing to be turned forward according to the request to turn pages forward.

Step 160: displaying a second content of screen sharing after turning the page.

In an embodiment, after the page turning is performed for the first content of screen sharing, the interactive whiteboard displays the second content of screen sharing of the previous page. In an embodiment, the manner of obtaining the second screen sharing data by the interactive whiteboard is the same as the manner of obtaining the first screen sharing data, and thus the details are not described here again. In an embodiment, in order to ensure that the interactive whiteboard and the laptop computer realize the same change, it is necessary for the interactive whiteboard to display the same page turning process. For example, the page turning process may be that: the laptop computer controls to turn the page for the PPT and captures a screenshot during the page turning process to obtain the screen sharing data after the page turning, and transmits the screen sharing data to the interactive whiteboard; and then the interactive whiteboard processes the screen sharing data in the page turning and displays the corresponding content of screen sharing. The page turning process may also be that: the laptop computer sends a page turning form to the interactive whiteboard, and then the interactive whiteboard performs the page turning on the first content of screen sharing according to the page turning form, and displays the second content of screen sharing after turning the page.

In an embodiment, when the first content of screen sharing is removed from the display screen of the interactive whiteboard, the first annotation track for the first content of screen sharing is synchronously removed from the display screen of the interactive whiteboard, so as to achieve that the annotated content and the corresponding annotation track disappear from the display screen of the interactive whiteboard synchronously.

In an embodiment, the same removal operation is controlled to be performed on the first annotation track as on the first content of screen sharing. For example, when the first content of screen sharing is slid up and removed, the first annotation track synchronously performs the slide up and removal. In an embodiment, the manner of controlling the same removal operation to be performed on the first annotation track and the first content of screen sharing may be that: the interactive whiteboard determines, according to the annotation position of the first annotation track, image data of the corresponding annotated content in the first content of screen sharing; tracks the image data by means of template matching when the request to turn pages forward is executed for the first content of screen sharing, so as to obtain the change results of the image data in real time; and controls the first annotation track to perform the same change according to the change results. In an embodiment, the image data includes the pixel values of multiple pixel points displaying the annotated content and the relative positional relationship between the plurality of pixel values, that is, the image data may be understood as a pixel block. In an embodiment, the manner of controlling the same removal operation to be performed on the first annotation track and the first content of screen sharing may also be that: the interactive whiteboard obtains an animation element contained in the first screen sharing data transmitted by the laptop computer and determines a changing rule of the first screen sharing data according to the animation element, and then determines, according to the changing rule, a trajectory changing rule of the first annotation track, so as to perform the same removal operation on the first annotation track and the first content of screen sharing. In an embodiment, the animation element contains a page turning manner for the first screen sharing data and a changing manner for a text element in the first screen sharing data. In summary, it can be seen that controlling the change of the first annotation track and controlling the change of the first content of screen sharing are two different operations that are performed synchronously.

Step 170: receiving a input to turn pages backward.

In an embodiment, the input to turn pages backward is used to control the page number of the PPT data to change, and control the second content of screen sharing to be turned backward. The input to turn pages backward is similar to the request to turn pages forward, and will not be repeated here.

Step 180: displaying the first content of screen sharing and the first annotation track.

In an embodiment, executing the input to turn pages backward to display the first content of screen sharing is similar to executing the request to turn pages forward to display the second content of screen sharing, and will not be repeated here.

In an embodiment, when the first content of screen sharing is displayed again, the corresponding first annotation track is displayed synchronously. In an embodiment, when the first annotation track is displayed for the first time, the correspondence between the first content of screen sharing and the first annotation track is recorded. When the first content of screen sharing is displayed again, the corresponding first annotation track is queried according to the correspondence and displayed synchronously. In an embodiment, the correspondence may be established by the manner of: determining the correspondence between the first annotation track and the page number of the first content of screen sharing, and synchronously recording the annotation position of the first annotation track. When the first content of screen sharing is displayed, the first annotation track corresponding to the first content of screen sharing can be determined according to the correspondence, and then can be displayed at the recorded annotation position. The correspondence may also be established by the manner of: determining the correspondence between the first annotation track and the image data annotated in the first content of screen sharing; synchronously recording the relative positional relationship between the first annotation track and first annotated content; recognizing the image data contained in the first annotated content when the first annotated content is displayed; then determining the first annotation track corresponding to the first annotated content according to the correspondence, and displaying the first annotation track according to the relative positional relationship.

In an embodiment, when the first content of screen sharing is displayed, the first annotation track is controlled to display to appear in a manner same as the first content of screen sharing. For example, the first content of screen sharing appears on the display screen of the interactive whiteboard by moving from top to bottom, and the first annotation track is controlled to synchronously appear on the interactive whiteboard by moving from top to bottom. The technical means used for controlling the first annotation track to perform the same appearing manner as the first content of screen sharing does is similar to the technical means used for controlling the same removal operation to be performed on the first annotation track as on the first content of screen sharing, and therefore is not repeated.

Based on the above embodiments, the above method further includes: saving the first content of screen sharing and the first annotation track in association, if an end instruction is received. In an embodiment, when the end instruction is received, the first content of screen sharing and the first annotation track are stored in association, which can facilitate the user to view this annotation content in the subsequent process.

The technical solution provided in this embodiment uses the technical means of: receiving the command to display content of screen sharing, and displaying the first content of screen sharing; displaying the first annotation track when receiving the first annotation command; executing the page turning operation after receiving the request to turn pages forward, and displaying the second content of screen sharing; and displaying the first content of screen sharing and the first annotation command again after receiving the input to turn pages backward. In this way, the annotating for the first content of screen sharing under the screen sharing scenario is achieved; and when the first content of screen sharing appears on or disappears from the display screen of the interactive whiteboard, the first annotation track appears or disappears synchronously, which guarantees the synchronous change of the first content of screen sharing and the first annotation track.

Embodiment II

Figure 5:
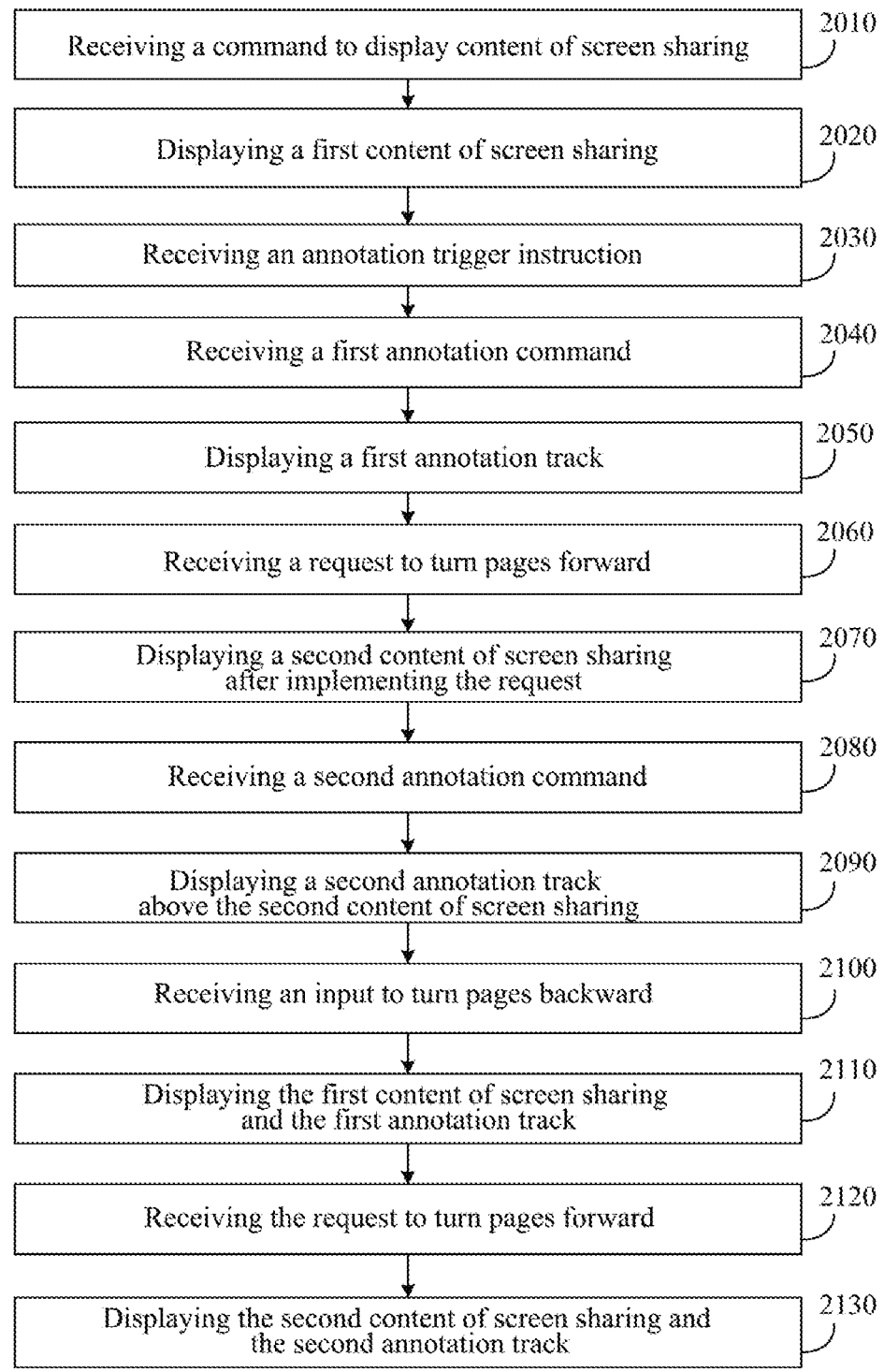
FIG. 5 is a flowchart of a method of providing annotation track on the content displayed on an interactive whiteboard provided in another embodiment of the disclosure.

FIG. 5 is a flowchart of an the method of providing annotation track on the content displayed on an interactive whiteboard provided in another embodiment. This embodiment is described based on the above embodiment. Referring to FIG. 5, the method of providing annotation track on the content displayed on an interactive whiteboard provided in this embodiment includes the following steps.

Step 2010: receiving a command to display content of screen sharing.

Step 2020: displaying a first content of screen sharing.

Step 2030: receiving an annotation trigger instruction.

In an embodiment, the annotation trigger instruction is used to start an annotation function. In an embodiment, the user can transmit the annotation trigger instruction to the interactive whiteboard by clicking a preset button or by inputting a preset touch operation (such as double-click, long-press, multi-touch, or circle). For example, a virtual button is added in the display screen of the interactive whiteboard. When it is detected that the virtual button is pressed, the interactive whiteboard determines that an annotation trigger instruction is received. In another example, when the interactive whiteboard detects that a long-press operation of more than 3 seconds (S) is received at any position on the display screen, the interactive whiteboard determines that an annotation trigger instruction is received.

In an embodiment, after receiving the annotation trigger instruction, a second display layer for displaying the first annotation track is added for the interactive whiteboard.

In an embodiment, the above description is based on the example where the user issues the annotation trigger instruction on the interactive whiteboard. In practical applications, the user can also issue the annotation trigger instruction through a laptop computer or an input device.

Step 2040: receiving a first annotation command.

In an embodiment, the first annotation command is used to annotate the first content of screen sharing.

Step 2050: displaying a first annotation track.

In an embodiment, the first annotation track is generated based on the first annotation command.

Step 2060: receiving a request to turn pages forward.

In an embodiment, the request to turn pages forward is used to trigger the first content of screen sharing to turn forward.

Step 2070: displaying a second content of screen sharing responsive to the request In an embodiment, after the second content of screen sharing is displayed, the first content of screen sharing and the first annotation track are cached, so as to be quickly retrieved after a input to turn pages backward is received. In practical applications, the interactive whiteboard can cache the content of screen sharing that has been displayed on the previous page relative to the current content of screen sharing and the content of screen sharing that has been displayed on the next page, as well as the respective annotation track, so as to quickly display the corresponding content of screen sharing and annotation track after receiving the command to turn pages.

Step 2080: receiving a second annotation command.

In an embodiment, the second annotation command is used to annotating the second content of screen sharing.

Step 2090: displaying a second annotation track overlaying the second content of screen sharing.

In an embodiment, the second annotation track is generated based on the second annotation command.

In an embodiment, the manner of receiving the second annotation command and the manner of generating the second annotation track are similar to the manner of receiving the first annotation command and the manner of generating the first annotation track, and the details are not repeated here.

In an embodiment, the second annotation track shares the second display layer with the first annotation track. In other words, the annotation trajectories for annotating the content of screen sharing are displayed in the second display layer.

Step 2100: receiving a input to turn pages backward.

In an embodiment, the input to turn pages backward is used to control the second content of screen sharing to be turned backward.

Step 2110: displaying the first content of screen sharing and the first annotation track.

Step 2120: receiving the request to turn pages forward.

In an embodiment, the request to turn pages forward is used to control the first content of screen sharing to be turned forward.

Step 2130: displaying the second content of screen sharing and the second annotation track.

In an embodiment, the second content of screen sharing and the second annotation track are displayed in the interactive whiteboard synchronously. In an embodiment, the implementation of synchronously displaying the second content of screen sharing and the second annotation track in the interactive whiteboard is similar to the implementation of displaying the first content of screen sharing and the first annotation track, and the details are not described here again.

The technical solution provided in this embodiment is exemplarily described as follow.

Figure 6:
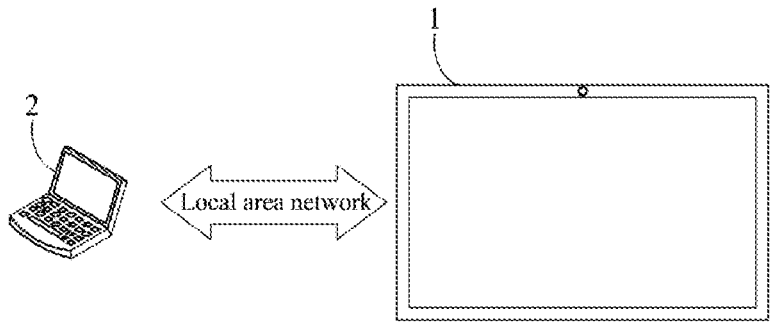
FIG. 6 is a schematic structural diagram of an interactive system provided in an embodiment of the disclosure.

FIG. 6 is a schematic structural diagram of an interactive system provided in an embodiment. Referring to FIG. 6, the interactive whiteboard 1 and the laptop computer 2 are connected with each other through a local area network. In an embodiment, the screen sharing application software is installed in the laptop computer 2 and the interactive whiteboard 1, respectively. In this embodiment, after the laptop computer 2 and the interactive whiteboard 1 respectively starts the screen sharing application software and establishes a data connection, the interactive whiteboard 1 determines that the command to display content of screen sharing is received.

Figure 7:
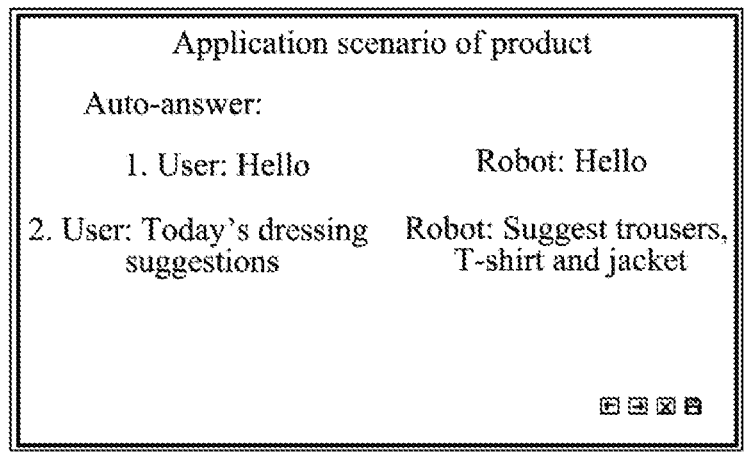
FIG. 7 is a schematic diagram of a display interface of a laptop computer provided in an embodiment of the disclosure.

In an embodiment, the laptop computer 2 displays the fifth page of a PPT, and FIG. 7 is referred to for the display content of the laptop computer 2. At this time, the laptop computer 2 captures a screenshot of the display data to obtain the first screen sharing data, and transmits the first screen sharing data and the page number together to the interactive whiteboard 1. The first screen sharing data is converted into the first content of screen sharing and displayed by the interactive whiteboard 1. At this time, the interactive whiteboard 1 and the laptop computer 2 display the same content except for the display scale.

Figure 8:
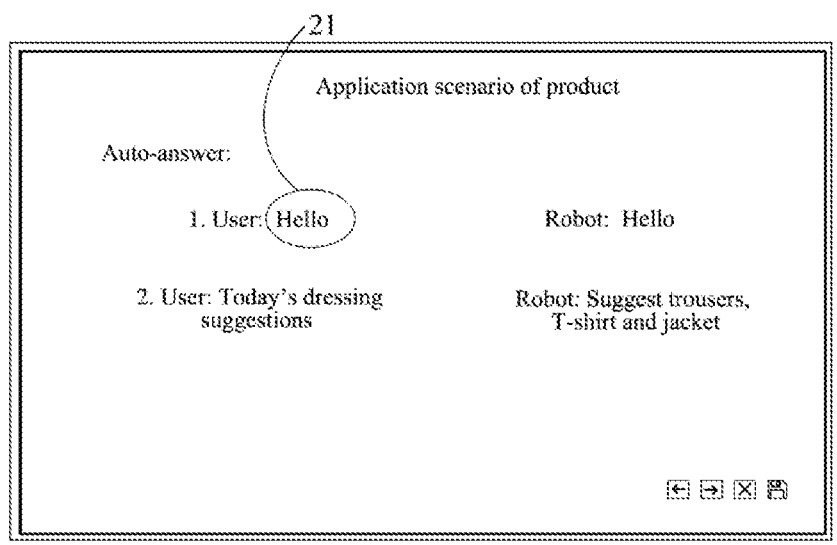
FIG. 8 is a schematic diagram of a display interface of an interactive whiteboard provided in an embodiment of the disclosure.

In an embodiment, the interactive whiteboard 1 receives the annotation trigger instruction, and adds the second display layer in the display screen. After that, the interactive whiteboard 1 receives the user's touch operation through the second display layer, and regards the signal obtained based on the touch operation as the first annotation command. Then, the interactive whiteboard 1 generates a first annotation track based on the first annotation command, and displays the first annotation track. To this end, FIG. 8 is referred to for the display interface of the interactive whiteboard 1, that is, a first annotation track 21 is added to the first content of screen sharing.

Figure 9:
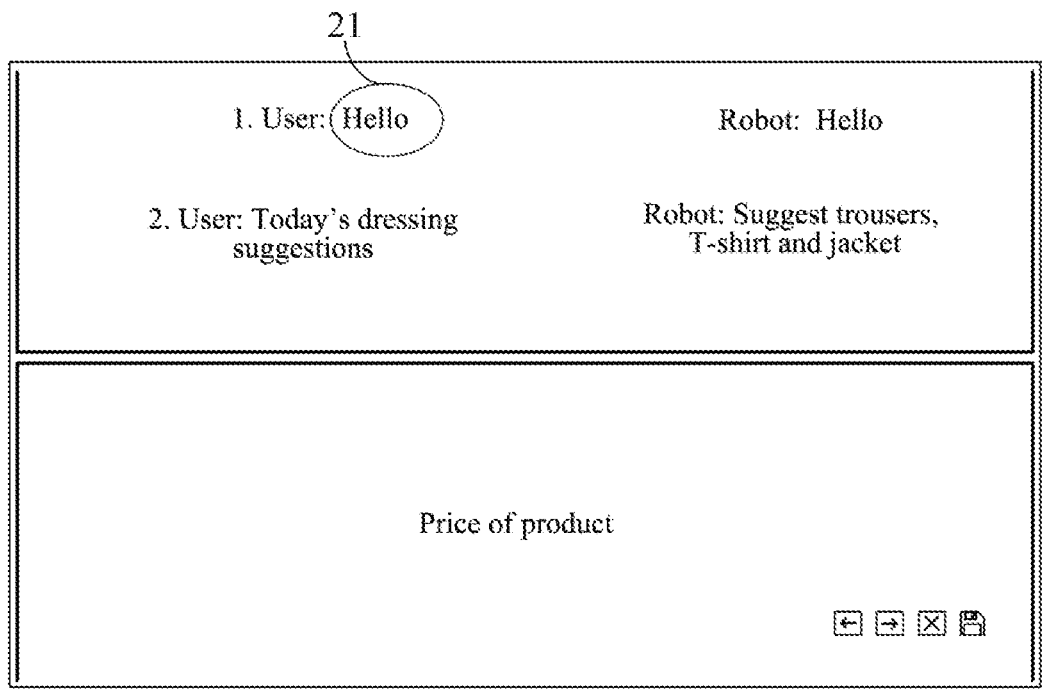
FIG. 9 is a screenshot of a certain frame of an interactive whiteboard during page turning provided in an embodiment of the disclosure.
Figure 10:
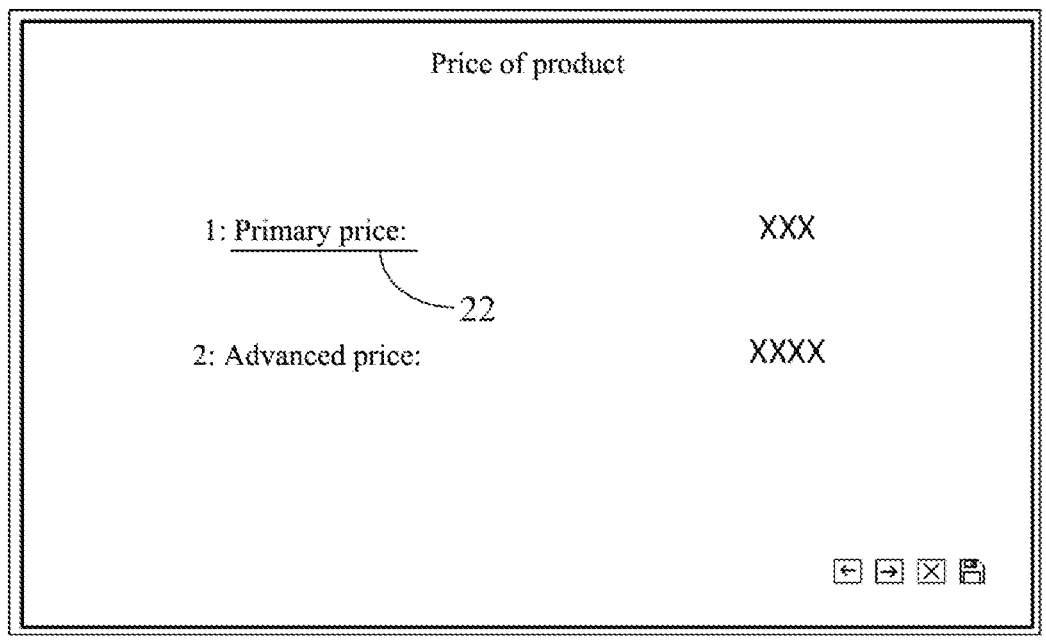
FIG. 10 is a schematic diagram of a display interface of an interactive whiteboard provided in another embodiment of the disclosure.

Thereafter, the laptop computer 2 receives the request to turn pages forward and executes the request to turn pages forward, so as to display the sixth page of the PPT after turning the page. At the same time, the laptop computer 2 transmits the second screen sharing data obtained based on the sixth page of the PPT and the page number corresponding to the sixth page together to the interactive whiteboard 1. During the page turning process, the interactive whiteboard 1 controls the first annotation track 21 to change synchronously with the change of the first content of screen sharing. FIG. 9 is a screenshot of a certain frame of the interactive whiteboard during page turning provided in an embodiment. Referring to FIG. 9, the page turning mode is to move the page from bottom to top. When the first content of screen sharing is undergoing the page turning, the first annotation track 21 moves synchronously from bottom to top. After the page turning is completed, the interactive whiteboard 1 displays the second content of screen sharing. At this time, the interactive whiteboard 1 receives the user's touch operation, regards the touch operation as the second annotation command, and displays the second annotation track according to the second annotation command. In an embodiment, FIG. 10 is referred to for the display interface of the interactive whiteboard 1, that is, a second annotation track 22 is added to the second content of screen sharing. In an embodiment, after displaying the second content of screen sharing, the interactive whiteboard 1 establishes a correspondence between the first content of screen sharing and the first annotation track.

In an embodiment, after receiving the input to turn pages backward, the laptop computer 2 sends the input to turn pages backward to the interactive whiteboard 1. At this time, the interactive whiteboard 1 performs the page turning for the second content of screen sharing and the second annotation track, determines the first annotation track corresponding to the first content of screen sharing according to the above correspondence, and then displays the first content of screen sharing and the first annotation track. At this time, the correspondence between the second content of screen sharing and the second annotation track is established. When the laptop computer 2 receives the request to turn pages forward again, the above operations are repeated, so that the interactive whiteboard 1 displays the second content of screen sharing and the second annotation track again.

The technical solution provided in this embodiment uses the technical means of: receiving the command to display content of screen sharing, and displaying the first content of screen sharing; starting the annotation function after receiving the annotation trigger instruction; receiving the first annotation command and displaying the corresponding first annotation track; executing the page turning to display the second content of screen sharing when receiving the request to turn pages forward, and receiving the second annotation command to display the corresponding second annotation track; then receiving the input to turn pages backward to display the first content of screen sharing and the first annotation command again; and receiving the request to turn pages forward to display the second content of screen sharing and the second annotation command again. In this way, the annotating for the content of screen sharing under the screen sharing scenario is achieved, and it is ensured that the content of screen sharing and the annotation track change synchronously. That is, synchronously appearing on or disappearing from the display screen, so as to make the realizing process of the annotating closer to the actual annotating process.

Embodiment III

Figure 11:
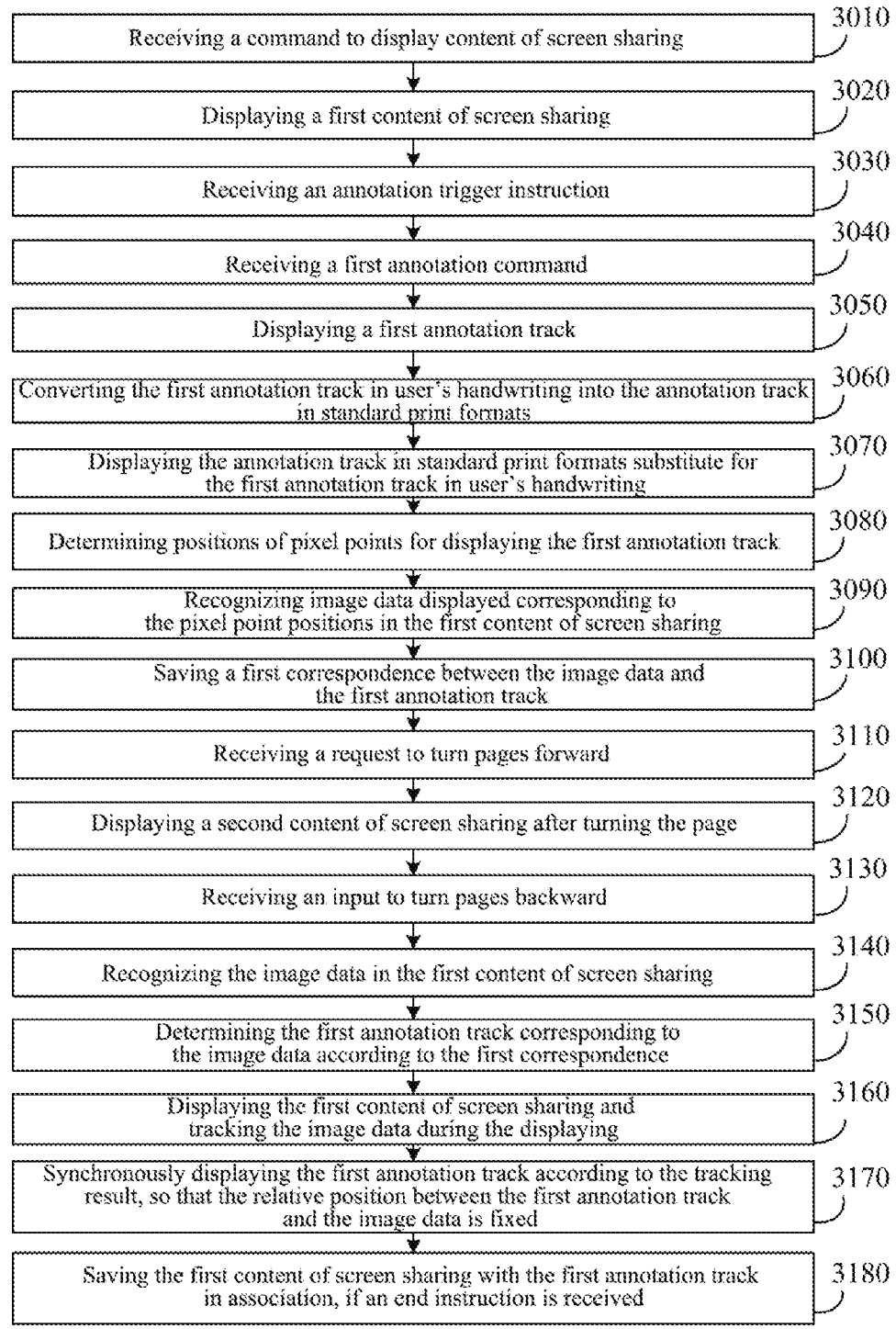
FIG. 11 is a flowchart of a method of providing annotation track on the content displayed on an interactive whiteboard provided in another embodiment of the disclosure.

FIG. 11 is a flowchart of a method of providing annotation track on the content displayed on an interactive whiteboard provided in an embodiment. This embodiment is described based on the above embodiments. Referring to FIG. 11, the method of providing annotation track on the content displayed on an interactive whiteboard provided in this embodiment includes the following steps.

Step 3010: receiving a command to display content of screen sharing.

Step 3020: displaying a first content of screen sharing.

Step 3030: receiving an annotation trigger instruction.

In an embodiment, the annotation trigger instruction is used to start the annotation function.

Step 3040: receiving a first annotation command.

In an embodiment, the first annotation command is used to annotate the first content of screen sharing.

Step 3050: displaying a first annotation track.

In an embodiment, the first annotation track is generated based on the first annotation command.

Step 3060: converting the first annotation track in user's handwriting into the annotation track in standard print formats.

In an embodiment, the first annotation track inputted by the user may be an annotation track that is not smooth or not neat. For aesthetic reasons, the first annotation track may be converted, that is, the handwritten first annotation track may be converted into a computer-standard print formats. The specific converting manner is not limited in this embodiment. For example, the shape and the shape parameters of the first annotation track are recognized, and the corresponding standard formats is drawn as the standard print formats. For another example, the first annotation track is smoothed to obtain a standard print formats with smooth lines.

Step 3070: displaying the annotation track in standard print formats substitute for the first annotation track in user's handwriting.

In an embodiment, the first annotation track is erased, and the shaped trajectory is displayed at the position corresponding to the first annotation track.

Figure 12:
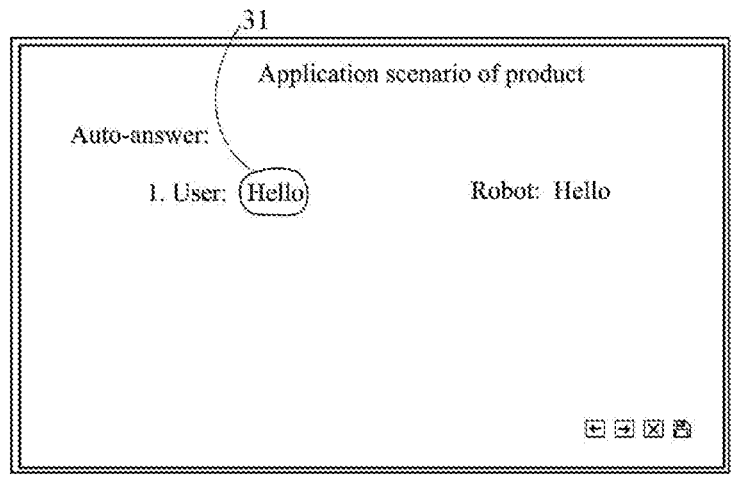
FIG. 12 is a schematic diagram of a display interface of an interactive whiteboard provided in another embodiment of the disclosure.
Figure 13:
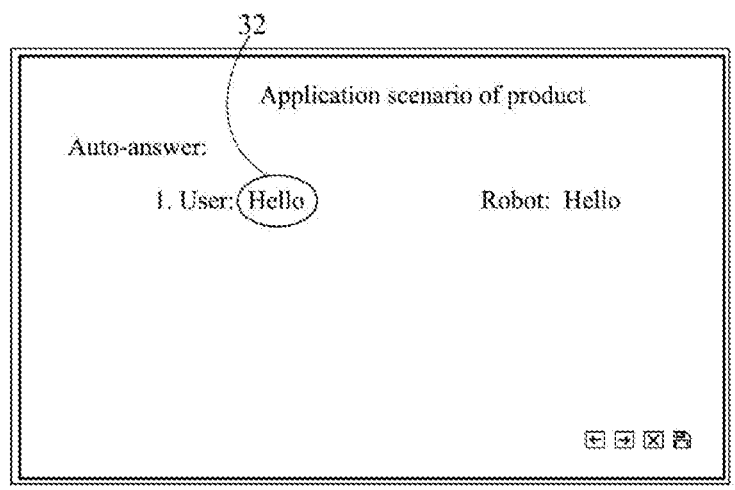
FIG. 13 is a schematic diagram of a display interface of an interactive whiteboard provided in another embodiment of the disclosure.

For example, referring to FIG. 12, when the interactive whiteboard displays the first content of screen sharing, a first annotation track 31 is displayed according to the first annotation command inputted by the user. In an embodiment, it is determined that the first annotation track 31 is elliptical, and the major axis and the minor axis of the ellipse are determined according to the size of the first annotation track 31, thereby obtaining the standard print formats. At this time, referring to FIG. 13, the interactive whiteboard replaces the first annotation track with the standard print formats 32.

Figure 14:
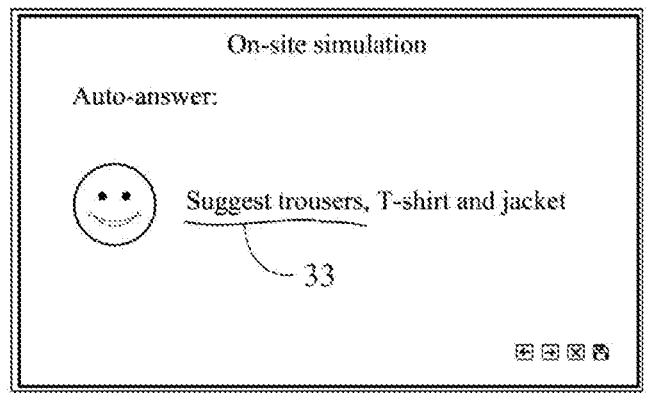
FIG. 14 is a schematic diagram of a display interface of an interactive whiteboard provided in another embodiment of the disclosure.
Figure 15:
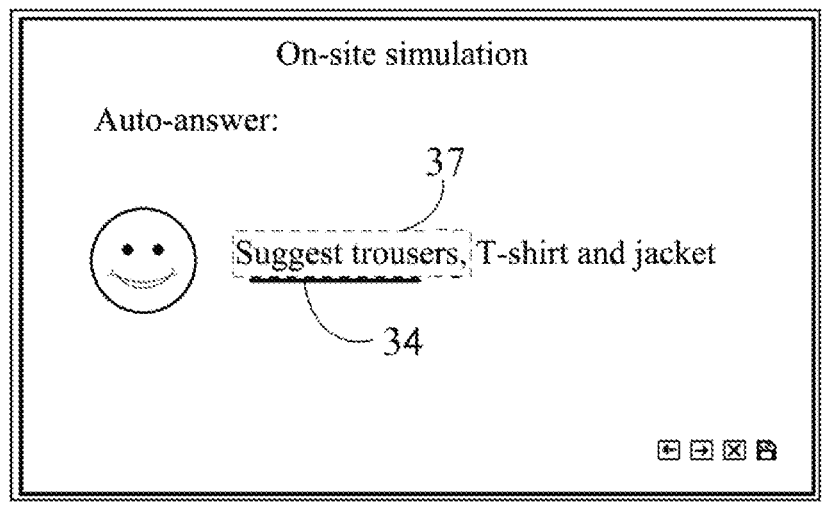
FIG. 15 is a schematic diagram of a display interface of an interactive whiteboard provided in another embodiment of the disclosure.

For another example, referring to FIG. 14, when the interactive whiteboard displays the first content of screen sharing, a first annotation track 33 is displayed according to the first annotation command inputted by the user. In an embodiment, it is determined that the first annotation track 33 is an unsmooth straight line, and then the first annotation track 33 is smoothed to obtain a smooth straight line. At this time, referring to FIG. 15, the interactive whiteboard replaces the first annotation track into the shaped result 34, that is, erases the unsmooth straight line, and displays the smooth straight line at the corresponding position.

In an embodiment, all of the first annotation trajectories mentioned in the subsequent steps are standard print formats. In addition, the annotation track corresponding to other content of screen sharing may also be converted into standard print formats. For example, the second annotation track corresponding to the second content of screen sharing is also be converted into standard print formats while being displayed.

Step 3080: determining positions of pixel points for displaying the first annotation track.

In an embodiment, the display screen of the interactive whiteboard realizes the display by changing the pixel values of multiple pixel points. In an embodiment, a pixel point is the smallest unit for independently displaying colors. When the resolution of the display screen is 1208×1024, it indicates that the display screen has 1028×1024 pixel points in total. In an embodiment, the interactive whiteboard can determine, according to the annotation position of the first annotation track, the pixel point positions for displaying the first annotation track on the display screen. The resolution parameter of the display screen mentioned in the above example is only for understanding the technical solution, but not a limitation of the resolution parameter of the display screen.

Figure 16:
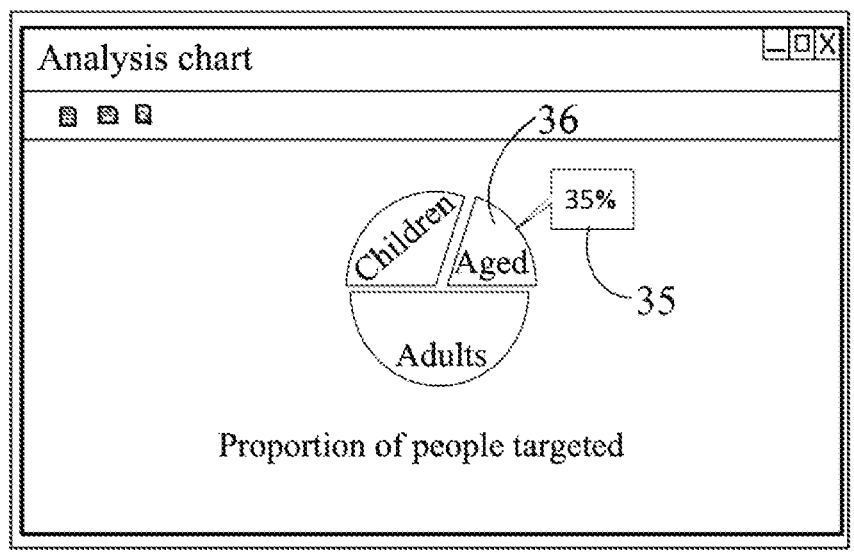
FIG. 16 is a schematic diagram of a display interface of an interactive whiteboard provided in another embodiment of the disclosure.

Considering that the user may annotate certain content of screen sharing in a blank space around the content of screen sharing in actual applications, at this time, the pixel point positions where the first annotation track is located are different from the pixel point positions where the annotated content is displayed; therefore, the pixel point positions for displaying the annotated content can be used as the pixel point positions of the first annotation track. In an embodiment, the relative positional relationship between the pixel point positions for displaying the annotated content and the first annotation track can be set according to actual conditions. For example, referring to FIG. 8, the first annotation track is a track of circling. At this time, the area inside the first annotation track is determined as the pixel point positions. For another example, referring to FIG. 16, the first annotation track includes an annotation box 35. At this time, a setting area 36 corresponding to the directed position of the annotation box 35 is set as the pixel point positions. For another example, referring to FIG. 15, the first annotation track is a straight line or a curve, and a setting area 37 above the first annotation track is set as the pixel point positions. In an embodiment, in the event that the first annotation track is a straight line or a curve and the content annotated by the first annotation track is text, text recognition can be performed on the display content in the area above the first annotation track, and the recognized complete text is regarded as the annotated content; thereafter the pixel point positions where the text is displayed are used as the pixel point positions of the first annotation track. That is, according to the shape and the position of the first annotation track, the setting area around the first annotation track is selected as the pixel point positions. Generally speaking, there are a plurality of pixel point positions.

Step 3090: recognizing image data displayed corresponding to the pixel point positions in the first content of screen sharing.

Due to the layered display for the first content of screen sharing and the first annotation track, after the pixel point positions are determined, the corresponding image data when the first content of screen sharing is displayed at the pixel point positions is determined in the first display layer. In an embodiment, the image data may also be denoted as a pixel block. The image data may reflect the relative positional relationship between the pixel values corresponding to all pixel points in the pixel point positions and multiple pixel values.

In an embodiment, in order to ensure that the subsequent first annotation track moves accurately after the image data, the integrity of the image data may be determined after the image data is recognized. In the event that the image data is incomplete, the pixel point positions can be changed to obtain complete image data. In this embodiment, the manner of recognizing the integrity of the image data can be, but not limited to, such as machine learning methods. For example, after the image data is determined, the specific display content of the image data is recognized as half of a character; at this time, the pixel point positions are changed to determine the image data as a complete character.

Step 3100: saving a first correspondence between the image data and the first annotation track.

In an embodiment, the saving mode can be, but not limited to, such as adding a tag to the image data, and adding the same tag to the first annotation track synchronously. In an embodiment, the advantage of saving the first correspondence is to establish an association between the first annotation track and the first content of screen sharing. When the first content of screen sharing is re-displayed, it can be guaranteed according to the first correspondence that the first annotation track corresponding to the first content of screen sharing is displayed synchronously. In an embodiment, when the first correspondence is saved, the relative positional relationship between the image data and the first annotation track is saved synchronously, for example, the relative positional relationship of the first annotation track circling the image data, the relative positional relationship of the first annotation track located above the image data, or the like. In this way, the display position of the first annotation track is determined synchronously when the first annotation track is determined according to the first correspondence.

Step 3110: receiving a request to turn pages forward.

In an embodiment, the request to turn pages forward is used to control the first content of screen sharing to be turned forward.

Step 3120: displaying a second content of screen sharing after turning the page.

Step 3130: receiving a input to turn pages backward.

In an embodiment, the input to turn pages backward is used to control the second content of screen sharing to be turned backward.

Step 3140: recognizing the image data in the first content of screen sharing.

In an embodiment, when it is determined that the first content of screen sharing is re-displayed, an image recognition is performed on the first content of screen sharing so as to determine whether the image data exists or not. In an embodiment, the recognizing manner may be to traverse all pixel points of the first content of screen sharing so as to determine whether there is a pixel area having the same pixel values as the image data, and if so, the display content corresponding to the pixel area is used as the image data.

Step 3150: determining the first annotation track corresponding to the image data according to the first correspondence.

For example, the first annotation track whose tag is the same as that of the image data is searched for according to the first correspondence, and the relative positional relationship between the first annotation track and the image data is determined.

Step 3160: displaying the first content of screen sharing and tracking the image data during the displaying.

In an embodiment, the execution of the input to turn pages backward to display the first content of screen sharing is a dynamic process. In order to ensure that the relative position between the first annotation track and the image data is fixed during the dynamic process, it is set in this embodiment that the image data is tracked in real time during the process of displaying the first content of screen sharing, so as to determine the change trajectory of the image data. In an embodiment, the interactive whiteboard may employ a template matching method to track the image data and obtain a tracking result which contains the moving trajectory of the image data.

Step 3170: synchronously displaying the first annotation track according to the tracking result, so that the relative position between the first annotation track and the image data is fixed.

In an embodiment, the first annotation track is controlled to change synchronously according to the tracking result, that is, the first annotation track moves synchronously with the image data, so that the relative position between the first annotation track and the image data is fixed during the process of displaying the first content of screen sharing.

In an embodiment, if the image data is only partially displayed on the interactive whiteboard for some reason, for example, during the page turning, only part of the image data is displayed at a certain time; at this time, a ratio value is set. If the ratio of the number of pixel points of the displayed part of the image data to the total number of pixel points of the image data is greater than or equal to the ratio value, the first annotation track is controlled to change synchronously. If the ratio of the number of pixel points of the displayed part of the image data to the total number of pixel points of the image data is less than the ratio value, it is determined that the image data disappears from the interactive whiteboard; at this time, the first annotation track is controlled to disappear synchronously.

Step 3180: saving the first content of screen sharing with the first annotation track in association, if an end instruction is received.

In an embodiment, the end instruction is used to notify the interactive whiteboard of stopping the screen sharing. The end instruction may be triggered by the user through the laptop computer, or by the user on the interactive whiteboard, or by the user through the input device. In this embodiment, the form of the end instruction and the triggering rule are not limited. For example, an end trigger button is provided or an end touch-operation mode is set, and when it is detected that the end trigger button is clicked or an end touch operation is received, it is determined that the end instruction is received.

In an embodiment, after the end instruction is received, the first content of screen sharing and the first annotation track are saved. In an embodiment, the data of the first display layer and that of the second display layer is superimposed so as to realize the saving of the first content of screen sharing and the first annotation track in association. Or, the first display layer and the second display layer are saved separately, and when the saved data is displayed, the first display layer and the second display layer are superimposed and displayed so as to realize the editability of the first annotation track.

The first content of screen sharing is the data obtained after the first screen sharing data is zoomed in or out according to the screen sharing relation, and the interactive whiteboard only saves the first content of screen sharing and the corresponding first annotation track when performing the saving, therefore, if the saved data is sent to a laptop computer or other client and then opened in the laptop computer or other client, the resolution of the saved data needs to be converted to adapt to the resolution of the currently used display screen.

The technical solution provided in this embodiment realizes the addition of the first annotation track to the first content of screen sharing. The first annotation track is reshaped, which beautifies the user's viewing interface and improves the user's viewing comfort. By using the image recognition technology, it is ensured that the first annotation track changes synchronously with the annotated image data, realizing the tracking of the annotation in the PPT. And the first annotation track can be saved for subsequent viewing or editing.

Embodiment IV

Figure 17:
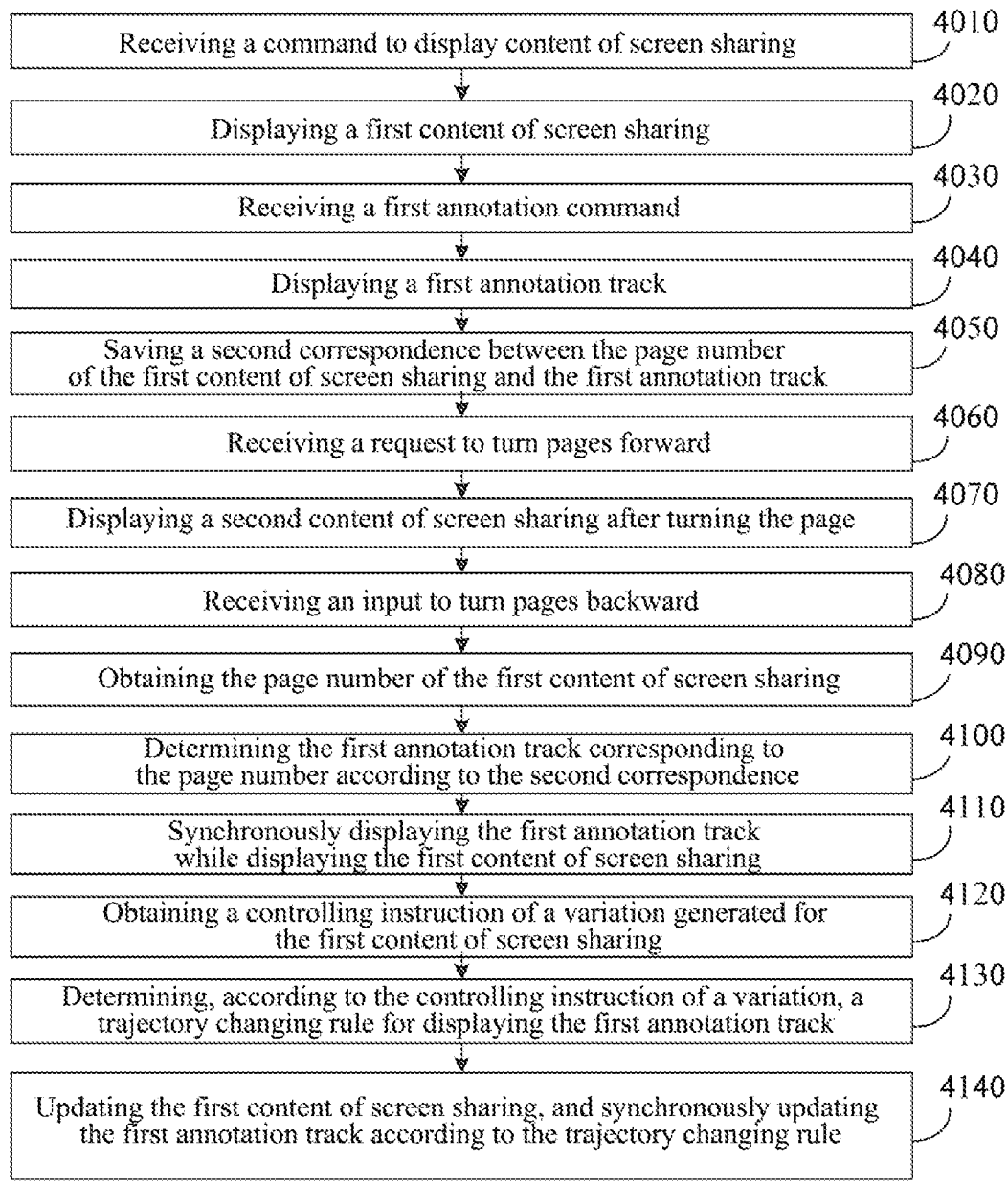
FIG. 17 is a flowchart of a method of providing annotation track on the content displayed on an interactive whiteboard provided in another embodiment of the disclosure.

FIG. 17 is a flowchart of an method of providing annotation track on the content displayed on an interactive whiteboard provided in another embodiment. The method of providing annotation track on the content displayed on an interactive whiteboard provided in this embodiment is described based on the above embodiments. In an embodiment, after displaying the first content of screen sharing and the first annotation track, the method further includes: obtaining a controlling instruction of a variation generated for the first content of screen sharing; determining, according to the controlling instruction of the variation, a trajectory changing rule for displaying the first annotation track; updating the first content of screen sharing, and synchronously updating the first annotation track according to the trajectory changing rule.

In an embodiment, the determining, according to the controlling instruction of a variation, the trajectory changing rule for displaying the first annotation track includes: determining, in the first content of screen sharing, a target window to which the controlling instruction of a variation is targeted and a change controlling operation for the target window; determining an annotation position of the first annotation track; determining the trajectory changing rule for the first annotation track when the change controlling operation is performed on the target window, if the target window contains the annotation position.

Referring to FIG. 17, the method of providing annotation track on the content displayed on an interactive whiteboard provided in this embodiment includes the following steps.

Step 4010: receiving a command to display content of screen sharing.

Step 4020: displaying a first content of screen sharing.

Step 4030: receiving a first annotation command.

In an embodiment, the first annotation command is used to annotate the first content of screen sharing.

Step 4040: displaying a first annotation track.

In an embodiment, the first annotation track is generated based on the first annotation command.

Step 4050: saving a second correspondence between the page number of the first content of screen sharing and the first annotation track.

In an embodiment, when the interactive whiteboard displays the first content of screen sharing, the corresponding page number of the first content of screen sharing is clearly known. Therefore, the correspondence between the first content of screen sharing and the first annotation track can be determined by establishing the second correspondence between the page number and the first annotation track. In an embodiment, the manner of saving the first correspondence may be referred to for the manner of saving the second correspondence. While the second correspondence is saved, the annotation position of the first annotation track is saved synchronously. In an embodiment, the current display content of the second display layer where the first annotation track is located is determined, and the same page number as the first content of screen sharing is established for the current display content of the second display layer. A third correspondence between the display content of the second display layer and the first content of screen sharing is established according to the page number, where the size of the display content is the same as that of the first content of screen sharing, both of which are the size of the display screen of the interactive whiteboard.

Step 4060: receiving a request to turn pages forward.

In an embodiment, the request to turn pages forward is used to control the forward page turn of the first content of screen sharing.

Step 4070: displaying a second content of screen sharing after turning the page.

Step 4080: receiving a input to turn pages backward.

In an embodiment, the input to turn pages backward is used to control the second content of screen sharing to turn backward to the first content of screen sharing.

Step 4090: obtaining the page number of the first content of screen sharing.

In an embodiment, after receiving the request to turn pages backward, the interactive whiteboard can obtain the page number of the first content of screen sharing.

Step 4100: determining the first annotation track corresponding to the page number according to the second correspondence.

In an embodiment, the second correspondence is traversed to determine whether there is the first annotation track corresponding to the page number or not. If there is the corresponding first annotation track, the corresponding first annotation track and annotation position are obtained.

Step 4110: synchronously displaying the first annotation track while displaying the first content of screen sharing.

In an embodiment, the interactive whiteboard can receive a compressed package of a PPT when starting the screen sharing. After processing the compressed package of the PPT, the interactive whiteboard can determine the page turning mode for each page in the PPT. When the interactive whiteboard displays the PPT, if the page turning operation is performed, the current page turning mode is determined according to the compressed package of the PPT. The first annotation track is turned synchronously as the current page turning mode. For example, in the event that the page turning mode is to turn the page from bottom to top in the manner of shift, when the turning of the page from bottom to top in the manner of shift is performed on the first content of screen sharing, the display content containing the first annotation track is controlled to undergo the turning of the page from bottom to top in the manner of shift synchronously, so as to ensure that the first annotation track and the first content of screen sharing move synchronously.

In this embodiment, only the displaying of the first content of screen sharing and the first annotation track are described; however, in practical applications, the implementation of the page turning and removing of the displayed first content of screen sharing and first annotation track is the same as the implementation of displaying the first content of screen sharing and the first annotation track.

In an embodiment, it is considered that the actual applications further include a scenario where the corresponding annotation track is synchronously changed only because of the change of the display content while the page of the PPT is not turned, in addition to the scenario where the PPT undergoes the page turning to cause the synchronous change of the corresponding annotation track. For example, when the annotated content in the PPT disappears from this page of the PPT, the corresponding annotation track should disappear synchronously. For another example, when the annotated content in the PPT is moved or zoomed in or out on this page of the PPT, the corresponding annotation track should be moved or zoomed in or out synchronously. At this time, the implementation of the operations of the above scenarios may refer to the following steps.

Step 4120: obtaining a controlling instruction of a variation generated for the first content of screen sharing.

In an embodiment, the interactive whiteboard can also determine, according to the compressed package of the PPT, an animation element corresponding to each text element in each page of the PPT, that is, the interactive whiteboard can determine, through the compressed package of the PPT, the changing sequence and the changing rule for the PPT during the slide show. Generally speaking, PPT is usually made by writing numbers, drawing or inserting tables, pictures and videos into a text box of the PPT. Therefore, the text element may be a text box containing the display content in the first screen sharing data, which may be displayed in the PPT or hidden. In an embodiment, the animation element is an operation performed by the text box, such as, moving upward by 5 pixels for a certain text box, moving left by 10 pixels for a certain text box, and removing a certain text box. When the interactive whiteboard displays the first content of screen sharing containing the text element, if the user performs a click operation on the laptop computer, the input device or the interactive whiteboard, the interactive whiteboard retrieves the corresponding animation element so as to obtain the current controlling instruction of a variation for the first content of screen sharing. In an embodiment, the controlling instruction of a variation contains the text element in the first screen sharing data and the animation element for the text element. The controlling instruction of a variation is used to make the interactive whiteboard clear about the changing rule for the content displayed in the PPT.

Step 4130: determining, according to the controlling instruction of a variation, a trajectory changing rule for displaying the first annotation track.

In an embodiment, the interactive whiteboard determines, according to a screen sharing relation, a target window of the text element in the first content of screen sharing and the corresponding change controlling operation for the animation element on the interactive whiteboard, simulates and performs the above change controlling operation for the target window, and thus obtains the trajectory changing rule for the first annotation track in the target window. In an embodiment, the step 4130 includes step 41310 to step 41330:

Step 41310: determining, in the first content of screen sharing, a target window to which the controlling instruction of a variation is targeted and a change controlling operation for the target window.

In an embodiment, coordinate points of the text element are mapped according to the screen sharing relation, so as to obtain the pixel positions corresponding to the text element being displayed by the interactive whiteboard, which are denoted as the target window. In an embodiment, the same mapping is performed on the animation element according to the screen sharing relation, so as to determine the change controlling operation that should be performed on the target window when the animation element is executed on the text element. For example, the resolution of the display screen of the laptop computer is 320×240, and the resolution of the display screen of the interactive whiteboard is 640×480. After the user performs a click operation on the laptop computer, the interactive whiteboard determines, through the compressed package of the PPT, the controlling instruction of a variation corresponding to the current click operation as: moving downward by 5 pixels for each pixel point contained in a quadrilateral with the pixel point (0, 0) and the pixel point (10, 10) as the diagonal points in the laptop computer. At this time, the interactive whiteboard determines, according to the screen sharing relation, that the position of the target window is a quadrilateral with the pixel point (0, 0) and the pixel point (20, 20) as the diagonal points; and correspondingly, the change controlling operation performed by the target window is to move downward by 10 pixels. The resolution parameters of the display screens mentioned in the above example are only for understanding the technical solution not as a limitation of the resolution parameters of the display screens.

Step 41320: determining the annotation position of the first annotation track.

Generally speaking, when the first annotation command is received, the annotation position is determined synchronously.

Step 41330: determining the trajectory changing rule for the first annotation track when the change controlling operation is performed on the target window, if the target window contains the annotation position.

In an embodiment, it is determined whether the annotation position is within the location area where the target window is located. If the annotation position is not within the location area, it means that when the change controlling operation is performed on the target window, the first annotation track will not change. At this time, the first annotation track remains unchanged. If the annotation position is within this location area, it means that when the change controlling operation is performed on the target window, the first annotation track may change. At this time, the trajectory changing rule for the first annotation track needs to be determined. In an embodiment, the trajectory changing rule includes changing information of the annotation position of the first annotation track.

In an embodiment, the manner of determining the trajectory changing rule for the first annotation track is to simulate and control the change of the first annotation track according to the change controlling operation, and then determine the trajectory changing rule. For example, the interactive whiteboard calculates the height, width and position of the target window, controls the target window to change according to the change controlling operation, and synchronously records the trajectory changing rule for the annotation position in the target window, so as to simulate and control the change of the first annotation track.

Step 4140: updating the first content of screen sharing, and synchronously updating the first annotation track according to the trajectory changing rule.

In an embodiment, when updating the first content of screen sharing, the laptop computer may send screenshots of the update process frame by frame to the interactive whiteboard, so as to update the first content of screen sharing; or, the interactive whiteboard may automatically show the PPT according to the user's click operation after receiving all of the PPT in advance, so as to update the first content of screen sharing. In an embodiment, the first annotation track is updated synchronously according to the trajectory changing rule so as to ensure that the first annotation track changes synchronously with the change of the first content of screen sharing.

The following provides an exemplary description for the technical solution provided in this embodiment:

FIG. 6 is referred to for the interactive system employed in this example. The screen sharing application software is installed in the interactive whiteboard 1 and the laptop computer 2, respectively. The following example mainly describes the implemented process of controlling the synchronous change of the first content of screen sharing and the first annotation track according to the controlling instruction of a variation.

Figure 18:
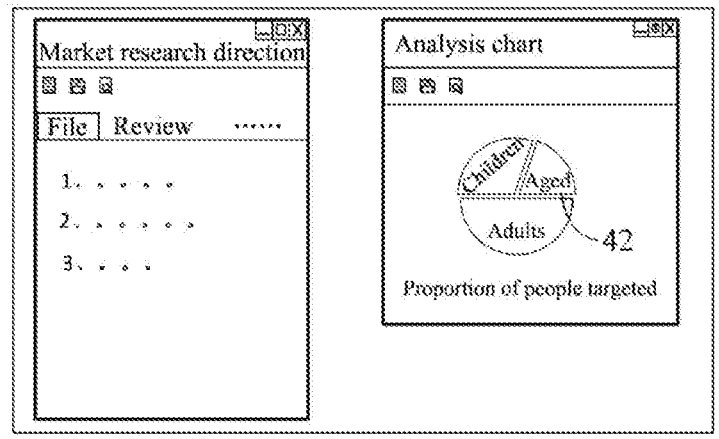
FIG. 18 is a schematic diagram of a display interface of a laptop computer provided in another embodiment of the disclosure.
Figure 19:
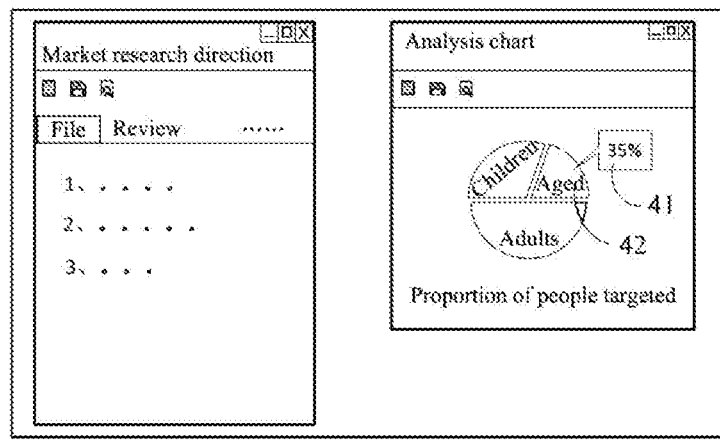
FIG. 19 is a schematic diagram of a display interface of an interactive whiteboard provided in another embodiment of the disclosure.
Figure 20:
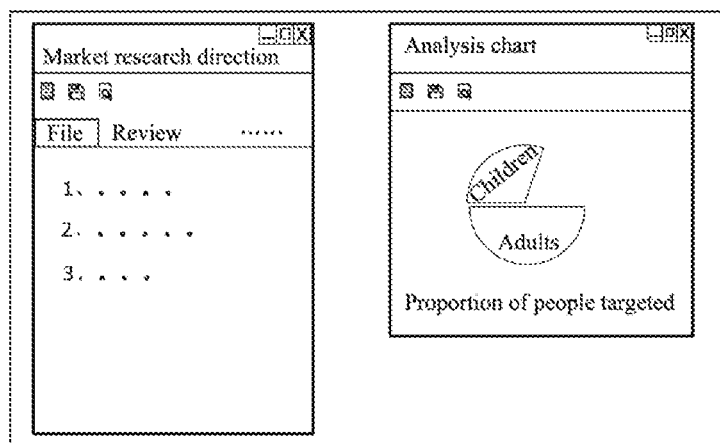
FIG. 20 is a schematic diagram of a display interface of an interactive whiteboard provided in another embodiment of the disclosure.

FIG. 18 is a schematic diagram of a first content of screen sharing displayed in a laptop computer provided in an embodiment; FIG. 19 is a schematic diagram of a first content of screen sharing and a corresponding first annotation track 41 displayed in an interactive whiteboard provided in an embodiment. For example, when the laptop computer receives a click operation, it is determined that a text box 42 in the first screen sharing data disappears from the screen. Correspondingly, the interactive whiteboard 1 determines, according to the compressed package of the PPT, the controlling instruction of a variation corresponding to the click operation. That is, the text box 42 is determined as the text element and the corresponding animation element is disappearing from the screen. The interactive whiteboard 1 determines according to the controlling instruction of a variation and the screen sharing relation that the first annotation track 41 is contained in the target window, and the trajectory changing rule is to make the first annotation track disappear. The laptop computer 2 performs the operation of making the text box 42 disappear; and at the same time, the interactive whiteboard 1 synchronously updates the first content of screen sharing according to the first screen sharing data transmitted by the laptop computer 2, and controls the first annotation track 41 to disappear. Referring to FIG. 20, FIG. 20 shows a schematic diagram of the display interface of the interactive whiteboard after the first annotation track 41 and the corresponding text box 42 disappear.

Figure 21:
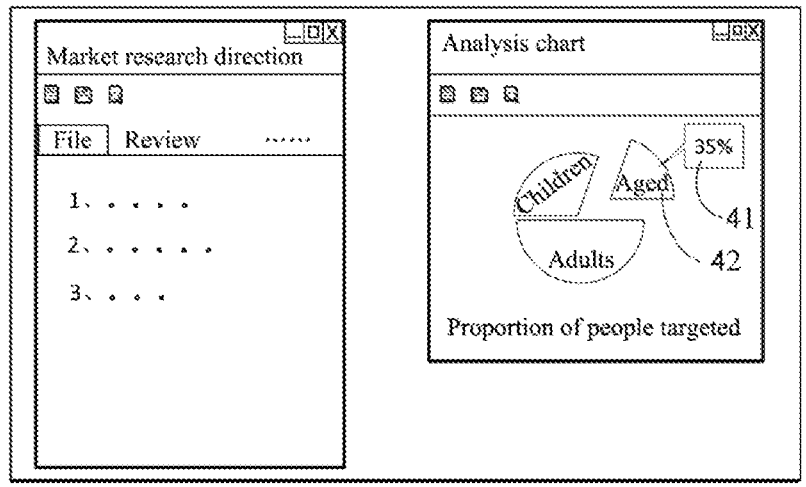
FIG. 21 is a schematic diagram of a display interface of an interactive whiteboard provided in another embodiment of the disclosure.

In another example, when the user issues a click operation on the laptop computer 2 for the display picture in FIG. 18, the interactive whiteboard 1 obtains the corresponding controlling instruction of a variation according to the compressed package of the PPT; recognizes the controlling instruction of a variation; and then determines that the position of the target window is the position where the text box 42 is located and the change controlling operation for the text box 42 is to move the text box 42. After that, the interactive whiteboard 1 determines that the first annotation track 41 is in the text box 42 and determines the trajectory changing rule for the first annotation track 41. At this time, the laptop computer 2 changes the display content according to the click operation, and captures a screenshot of the corresponding first screen sharing data and transmits the same to the interactive whiteboard 1. The interactive whiteboard 1 updates the corresponding first content of screen sharing according to the first screen sharing data, and controls the first annotation track 41 to be updated synchronously according to the trajectory changing rule. Referring to FIG. 21, FIG. 21 shows the display interface of the interactive whiteboard after the first content of screen sharing and the first annotation track 41 is updated.

Figure 22:
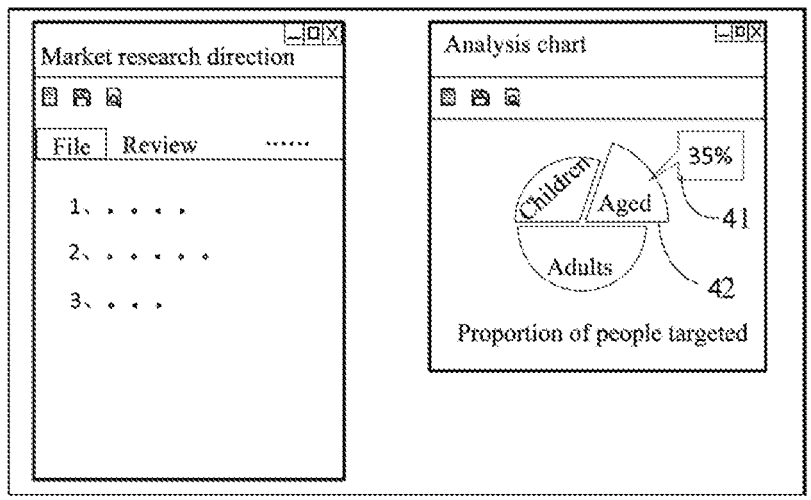
FIG. 22 is a schematic diagram of a display interface of an interactive whiteboard provided in another embodiment of the disclosure.

For still another example, when the user issues a click operation on the laptop computer 2 for the display image in FIG. 18, the interactive whiteboard 1 obtains the corresponding controlling instruction of a variation according to the compressed package of the PPT; recognizes the controlling instruction of a variation; then determines that the position of the target window is the position where the text box 42 is located and the change controlling operation for the text box 42 is to zoom the text box 42 out. After that, the interactive whiteboard 1 determines that the first annotation track 41 is within the text box 42 and determines the trajectory changing rule for the first annotation track 41. The laptop computer 2 changes the display content according to the click operation, and captures a screenshot of the corresponding first screen sharing data and transmits the same to the interactive whiteboard 1. The interactive whiteboard 1 updates the corresponding first content of screen sharing according to the first screen sharing data, and controls the first annotation track 41 to be updated synchronously according to the trajectory changing rule. Referring to FIG. 22, FIG. 22 shows the display interface after the first content of screen sharing and the first annotation track 41 is updated.

In an embodiment, in actual applications, when the page number of the PPT does not change but only the display content changes, the first annotation track may also be controlled to change synchronously with the change of the first content of screen sharing by means of image recognition.

In the technical solution provided in this embodiment, after the first content of screen sharing and the first annotation track is displayed for the first time, the second correspondence between the page number of the first content of screen sharing and the first annotation track is saved; when the first content of screen sharing is displayed again, the first annotation track is displayed synchronously according to the saved second correspondence; in the event that the page number of the first content of screen sharing does not change but only the display content changes, the trajectory changing rule for the first annotation track can be determined according to the controlling instruction of a variation; and the first annotation track is updated synchronously according to the trajectory changing rule when the first content of screen sharing is updated. In this way, the addition of the annotation to the content of screen sharing is achieved; by using the coordinate mapping technology, it is ensured that the annotation track changes synchronously with the change of the corresponding content of screen sharing, which accurately restores the annotation scenario.

Embodiment V

Figure 23:
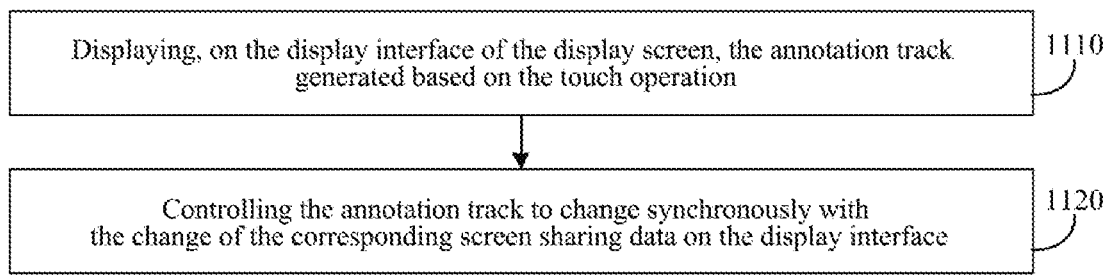
FIG. 23 is a flowchart of a method of providing annotation track on the content displayed on an interactive whiteboard provided in another embodiment of the disclosure.

FIG. 23 is a flowchart of an method of providing annotation track on the content displayed on an interactive whiteboard provided in another embodiment. The method of providing annotation track on the content displayed on an interactive whiteboard provided in this embodiment may be performed by an annotation displaying apparatus, which may be implemented by means of software and/or hardware, and may be integrated in a device. This embodiment is described by taking the interactive whiteboard as an example of the device for performing the method of providing annotation track on the content displayed on an interactive whiteboard. In an embodiment, the interactive whiteboard may be an integrated device that manipulates the content displayed on a display panel through touch technologies and realizes human-computer interactive operations. The interactive whiteboard integrates a plurality of functions of a projector, an electronic whiteboard, a curtain, audio equipment, a TV, a video conference terminal and the like.

In this embodiment, the interactive whiteboard establishes a data connection with at least one client. In an embodiment, the client includes, but is not limited to: a mobile phone, a laptop computer, a desktop computer and the like. The specific communication manner for the data connection may be realized, but not limited to, by means of the Internet, a local area network, Bluetooth, ZigBee protocol (ZigBee) or other communication manners. In an embodiment, when data interaction occurs between the interactive whiteboard and at least one client, a client of the at least one client which sends screen sharing data to the interactive whiteboard so that the interactive whiteboard displays the screen sharing data functions as an associated client. Typically, there is only one associated client.

In an embodiment, screen sharing application software is installed in the associated client and the interactive whiteboard, respectively. In an embodiment, the screen sharing service application software of the associated client is used to obtain screen sharing data and send the screen sharing data to the interactive whiteboard, and the screen sharing service application software of the interactive whiteboard is used to receive the screen sharing data and convert the screen sharing data into the data displayed on the display interface of the display screen of the interactive whiteboard. Generally, the interactive whiteboard cannot modify the display data on the display interface. In an embodiment, the resolution of the associated display screen of the associated client is different from that of the display screen of the interactive whiteboard, and the screen sharing data is obtained based on the resolution of the associated display screen. In order to display the screen sharing data in the display interface, it is necessary for the screen sharing service application software to determine a screen sharing relation according to the resolution of the associated display screen and the resolution of the display screen, and then convert the screen sharing data according to the screen sharing relation for display in the display interface.

In an embodiment, the screen sharing data is in a picture format, and the screen sharing data may be the screenshot data obtained by taking a screenshot of the associated display screen, or Microsoft Office PowerPoint (Microsoft Office PowerPoint, PPT) data. When the screen sharing data is the PPT data, the interactive whiteboard and the associated display screen display the PPT synchronously. At this time, the interactive whiteboard can know the display content of the currently showed PPT, the number of total pages of the PPT and the page number of the currently displayed page, but the interactive whiteboard does not have the right to perform any operations on the PPT data, such as a page turning operation, a modifying operation and the like.

In an embodiment, the displaying the screen sharing data includes: displaying, on the display interface of the display screen, the screen sharing data transmitted by the associated client; the displaying the annotation track includes: displaying, on the display interface, the annotation track generated based on a touch operation; the controlling the annotation track to change synchronously with the change of the corresponding screen sharing data on the display interface includes: controlling the annotation track to change synchronously with the change of the corresponding screen sharing data on the display interface.

FIG. 23 is a flowchart of an method of providing annotation track on the content displayed on an interactive whiteboard provided in another embodiment. Referring to FIG. 23, the method of providing annotation track on the content displayed on an interactive whiteboard provided in this embodiment includes the following steps.

Step 1110: displaying, on the display interface of the display screen, the annotation track generated based on the touch operation.

In an embodiment, the display interface is a setting area for displaying data in the display screen, and in this embodiment, it is used to display the screen sharing data transmitted by the associated client. Typically, the data displayed on the display interface is the data obtained by converting the screen sharing data according to the screen sharing relation.

In an embodiment, the display screen is a touch screen, and the display screen can receive a touch operation issued by a user through a finger or an associated device and send the same to a processor of the interactive whiteboard, so that the processor responds to the touch operation. In an embodiment, the associated device includes but is not limited to: a smart pen. In this embodiment, it is set that when the screen sharing data is displayed on the display interface, the obtained touch operation is regarded as the annotating operation by default. Or, after an annotation starting instruction is received, the obtained touch operation is regarded as the annotating operation. In an embodiment, the user can issue the annotation starting instruction to the interactive whiteboard by means of clicking a set button or inputting a preset touch operation (such as double-click or long-press).

In an embodiment, it is considered that when the user annotates the screen sharing data on the interactive whiteboard, the annotating includes not only marking the first content of screen sharing, such as marking a horizontal line under certain text data, or circling parts of the display content, but also making a text annotation on the content of screen sharing, such as adding an annotation box at a certain position and writing text data into the annotation box, or directly writing text data into the display interface. To satisfy the situation of adding the annotation box, at least one annotation box is preset, and each annotation box corresponds to a different annotation track. When the touch operation is received, it is determined whether the annotation track is the annotation track of the preset annotation box or not; if it is the annotation track of the preset annotation box, the preset annotation box is displayed as the annotation track; if it is not the annotation track of the preset annotation box, the trajectory obtained from the touch operation is displayed as the annotation track.

In an embodiment, since the user cannot edit the screen sharing data displayed on the display interface, to add annotations to the screen sharing data, a display layer is added in the display screen, and the display layer covers the current display interface. The display layer is used to interact with the user, that is, to receive a touch operation and display the corresponding touch trajectory. At this time, the user can only view the annotation track displayed on the display interface, but not the corresponding display layer. Or, a screenshot of the display interface is captured to obtain an image, and an annotation is added to the screen sharing data by means of annotating the image. No matter which manner is used to implement the annotating, the screen sharing data does not include the annotation track, that is, the annotation track and the screen sharing data are independent of each other.

In an embodiment, when the annotation track is displayed, an annotation tool box is displayed synchronously. The user can change the display parameters such as the color and the line width of the trajectory through the annotation tool box. Moreover, the annotation track is editable, and thus the user can change the position, size and shape of the annotation track according to actual requirements.

Step 1120: controlling the annotation track to change synchronously with the change of the corresponding screen sharing data on the display interface.

In an embodiment, when the user operates the display content of the associated display screen, the display content of the screen sharing data changes synchronously, so as to achieve the synchronous display of the display screen of the interactive whiteboard and the associated display screen. When the screen sharing data changes on the display interface, the annotation track is controlled to change synchronously with the change of the screen sharing data, so that the user can view the annotation track moving synchronously with the annotated content while the screen sharing data and the annotation track are independent.

In an embodiment, the specific implementation of controlling the annotation track to change synchronously with the change of the screen sharing data is not limited in this embodiment. For example, image data corresponding to the annotation track is determined on the display interface; the image data is tracked to obtain the change result of the image data in real time; and the annotation track is controlled to change synchronously with the change result. In another example, when the screen sharing data changes on the display interface, the changing rule for the screen sharing data is determined by obtaining the controlling instruction of a variation of the associated client, and then the changing rule for the annotation track is determined according to the changing rule for the screen sharing data, so as to ensure that the annotation track changes synchronously with the change of the screen sharing data.

In an embodiment, the correspondence between the screen sharing data and the annotation track is recorded. When the screen sharing data is displayed on the display interface again, the annotation track is controlled to appear synchronously in the display screen.

The technical solution provided in this embodiment is exemplarily described as follow.

Figure 24:
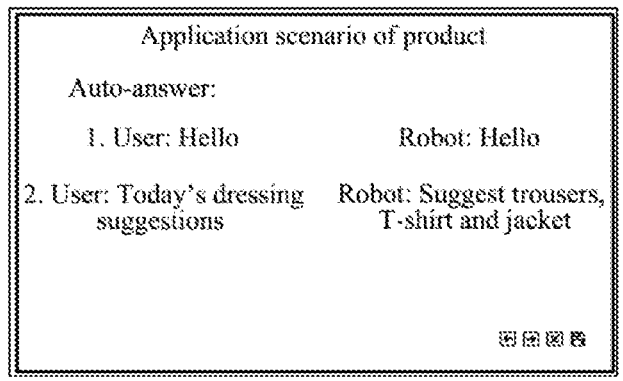
FIG. 24 is a schematic diagram of a display picture of an associated display screen of an associated client provided in an embodiment of the disclosure.
Figure 25:
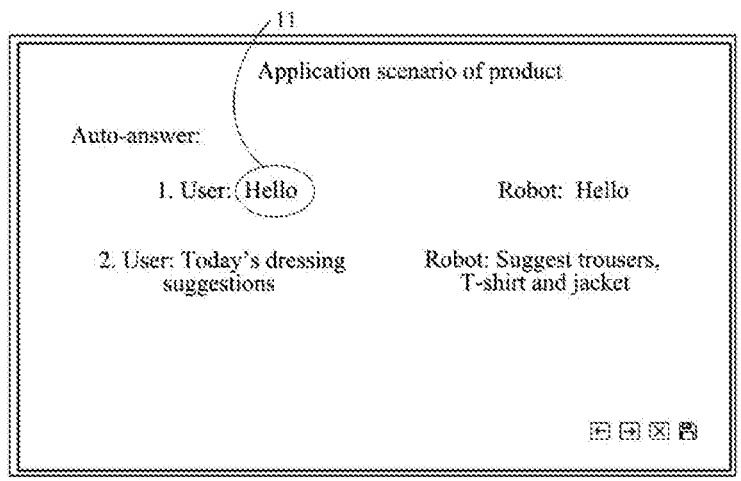
FIG. 25 is a schematic diagram of a display interface of a display screen of an interactive whiteboard provided in an embodiment of the disclosure.

Referring to FIG. 6, the interactive whiteboard 1 is connected with the laptop computer 2 through a local area network, where the laptop computer 2 is the associated client. FIG. 24 is a schematic diagram of a first display picture of the associated display screen of the associated client. In this embodiment, the laptop computer 2 generates screen sharing data based on the display picture of FIG. 24 and transmits the screen sharing data to the interactive whiteboard 1. After receiving the screen sharing data, the interactive whiteboard 1 processes the screen sharing data according to the screen sharing relation, and displays the same on the display screen. At this time, the interactive whiteboard 1 and the laptop computer 2 display the same content except for the display scale. In an embodiment, the interactive whiteboard 1 displays an annotation track 11 on the current display interface of the display screen based on the user's touch operation. FIG. 25 is a schematic diagram of the display interface of the display screen of the interactive whiteboard according to an embodiment. Comparing FIG. 25 and FIG. 24, it can be seen that the display scale of the screen sharing data in the interactive whiteboard 1 is different from that of the screen sharing data in the laptop computer 2, and the annotation track 11 is shown in FIG. 25.

Figure 26:
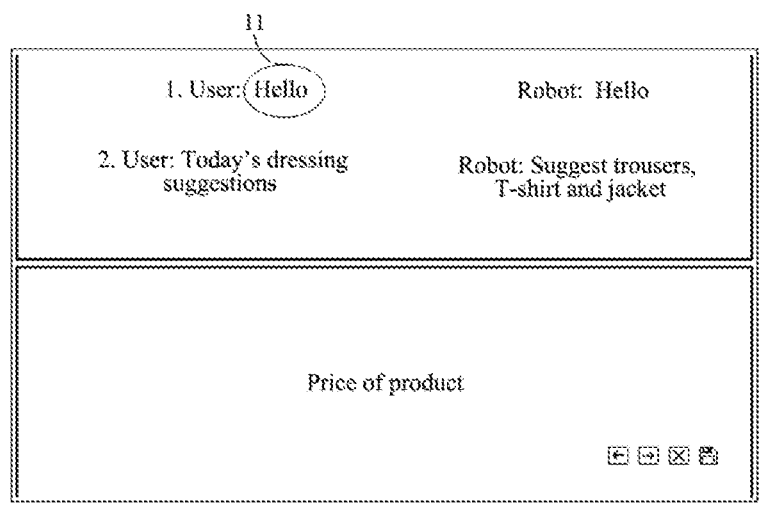
FIG. 26 is a schematic diagram of a display interface of a display screen of an interactive whiteboard provided in an embodiment of the disclosure.

In an embodiment, when the display picture of the laptop computer 2 changes, the display interface of the interactive whiteboard 1 changes synchronously. FIG. 26 is a schematic diagram of the display interface of the display screen of the interactive whiteboard provided in another embodiment.

FIG. 26 is the display interface at a certain time point when the screen sharing data is changing on the display interface. Referring to FIG. 26, when the display interface changes, the corresponding annotation track 11 changes synchronously, so that the user can view that the annotation track moves synchronously with the annotated content.

The technical solution provided in this embodiment employs the technical means of: displaying the screen sharing data transmitted by the associated client on the display interface of the display screen; displaying the annotation track generated based on the user's touch operation on the display interface; and controlling the annotation track to change synchronously when the screen sharing data changes on the display interface, thereby realizing that the screen sharing data is annotated on the end device displaying the screen sharing data under the screen sharing scenario, and at the same time ensuring that the annotation changes synchronously with the change of the screen sharing data, so that the annotating process of the end device is closer to the annotating process of the associated client, thereby improving the user's experience.

Embodiment VI

Figure 27:
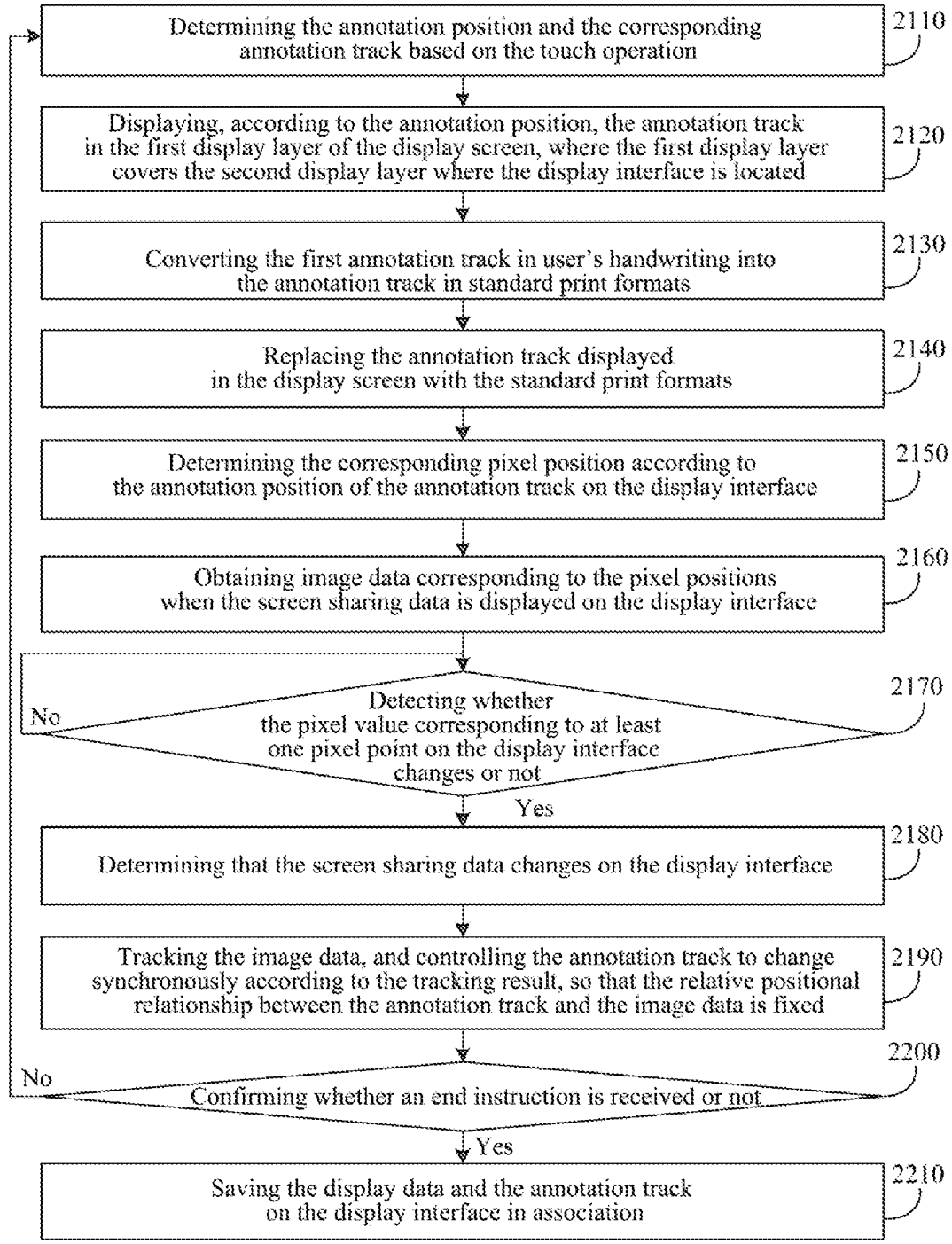
FIG. 27 is a flowchart of a method of providing annotation track on the content displayed on an interactive whiteboard provided in another embodiment of the disclosure.

FIG. 27 is a flowchart of an method of providing annotation track on the content displayed on an interactive whiteboard provided in another embodiment. This embodiment is described based on the above embodiments. Referring to FIG. 27, the method of providing annotation track on the content displayed on an interactive whiteboard provided in this embodiment includes the following steps.

Step 2110: determining the annotation position and the corresponding annotation track based on the touch operation.

In an embodiment, the annotation position is the touch position of the user's input trajectory.

In an embodiment, when the user performs a touch operation on the display screen, a parameter of an electronic element at the corresponding position inside the display screen will change; and the processor of the interactive whiteboard determines the touch position, i.e., the annotation position, according to the change of the parameter(s) of the electronic element(s). Taking the capacitive display screen as an example, when the user writes a straight line on the display screen, the capacitance at the corresponding positions will change sequentially according to the user's writing operation, and the processor can determine the annotation position according to the change in capacitance, and determine the corresponding annotation track.

Step 2120: displaying, according to the annotation position, the annotation track in the first display layer of the display screen, where the first display layer covers the second display layer where the display interface is located.

In an embodiment, since the screen sharing data on the display interface is in a picture format, the interactive whiteboard has no right to modify the screen sharing data. Therefore, in order to annotate the screen sharing data, in this embodiment, the whiteboard is configured to add a display layer in the display screen, and denote the same as the first display layer; and the display interface where the screen sharing data is located is denoted as the second display layer. Generally speaking, the second display layer is the default display layer. In an embodiment, the first display layer overlays the second display layer so as to receive the user's touch operation, and all of the contents related to the annotation, such as the annotation track, the annotation tool box and the like are displayed in the first display layer.

Figure 28:
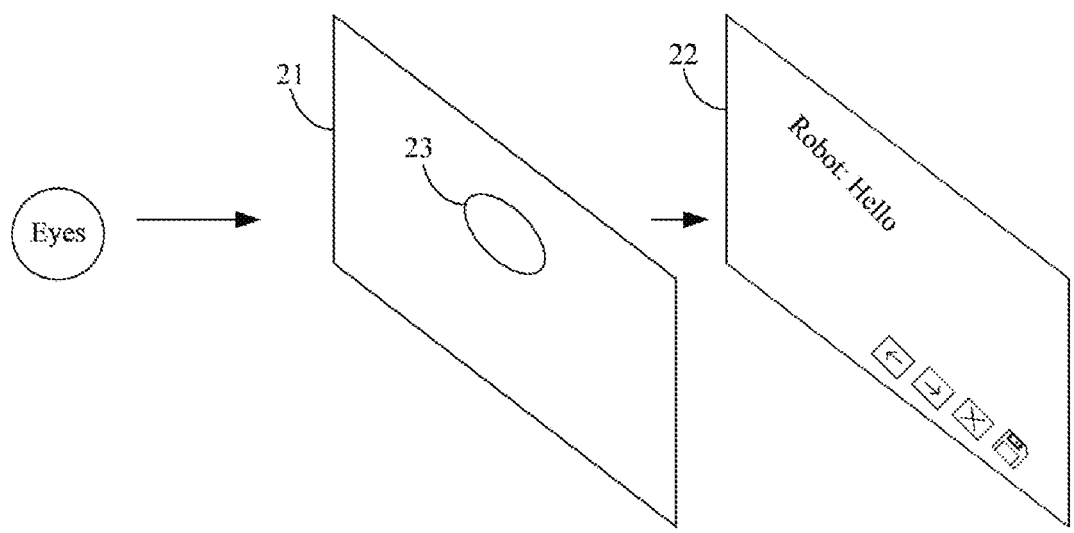
FIG. 28 is a schematic diagram of reference positions of a first display layer and a second display layer provided in another embodiment of the disclosure.
Figure 29:
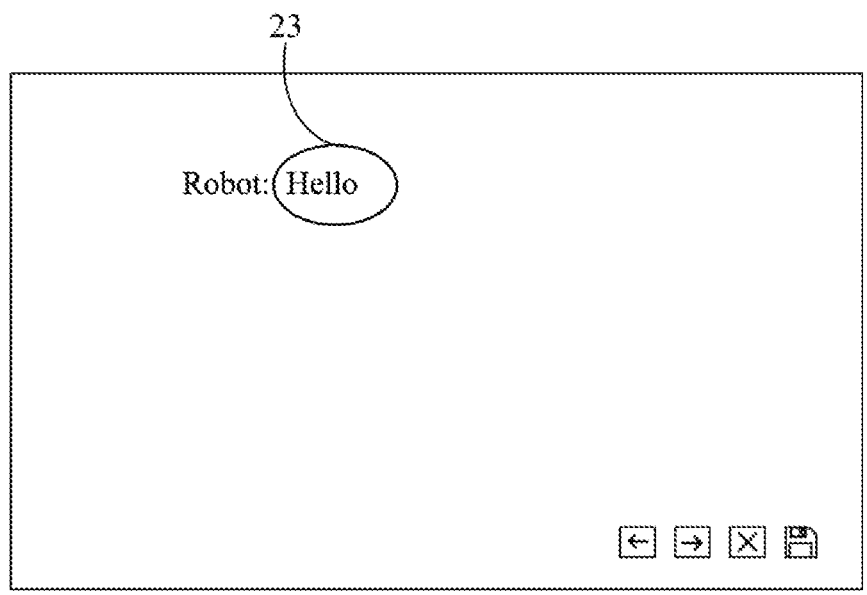
FIG. 29 is a schematic diagram of a display interface viewed from a user's perspective provided in another embodiment of the disclosure.

In an embodiment, the first display layer is completely overlapped with the second display layer. The first display layer is preset in an unfilled format and covers the second display layer, so that the user can only view the display interface of the second display layer as well as the annotation track, annotation tool box and the like of the first display layer. FIG. 28 is a schematic diagram of reference positions of the first display layer and the second display layer according to an embodiment. Referring to FIG. 28, the first display layer 21 is in an unfilled format, displays an annotation track 23, and covers the second display layer 22 where the screen sharing data is displayed. In an embodiment, FIG. 29 is a schematic diagram of a display interface viewed from a user's perspective provided in an embodiment. It can be seen from FIG. 29 that the user can view the annotation on the screen sharing data, but cannot clearly distinguish the first display layer 21 from the second display layer 22. It should be noted that, for ease of understanding, the first display layer and the second display layer are displayed separately in FIG. 28; however, in practical applications, the first display layer and the second display layer are in close contact.

Step 2130: converting the first annotation track in user's handwriting into the annotation track in standard print formats.

In an embodiment, the annotation track inputted by the user may be an annotation track that is not smooth or not neat. For aesthetic reasons, the annotation track may be converted, that is, the handwritten annotation track may be converted into a computer-standard formats. The specific converting manner is not limited to those provided in this embodiment. For example, the shape and the shape parameters of the annotation track are recognized, and the corresponding standard formats is drawn as the standard print formats. For another example, the annotation track is smoothed to obtain a standard print formats with smooth lines.

Step 2140: replacing the annotation track displayed in the display screen with the standard print formats.

In an embodiment, the annotation track displayed in the display screen is erased, and the standard print formats is displayed at the corresponding position.

Figure 30:
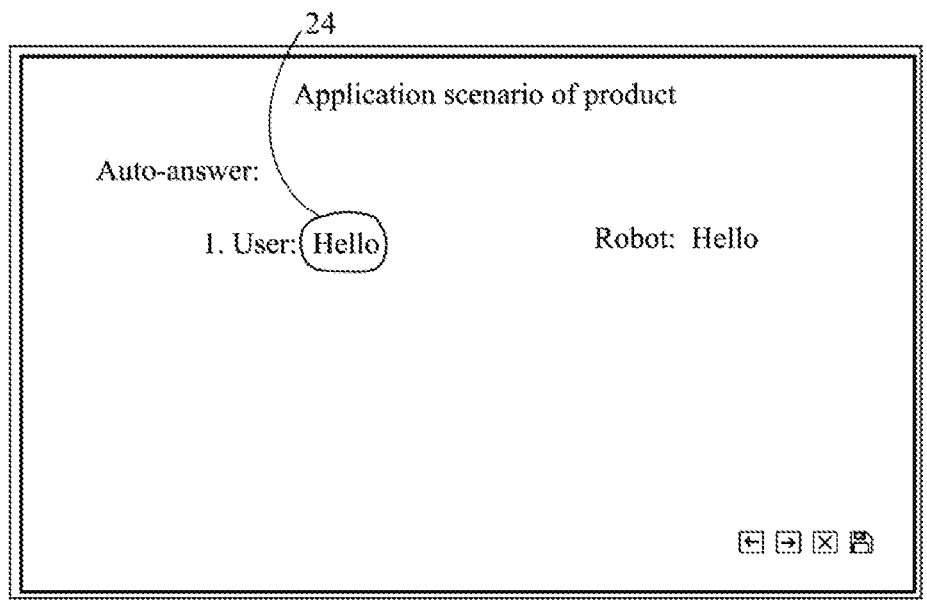
FIG. 30 is a schematic diagram of a display interface of a display screen of an interactive whiteboard provided in another embodiment of the disclosure.
Figure 31:
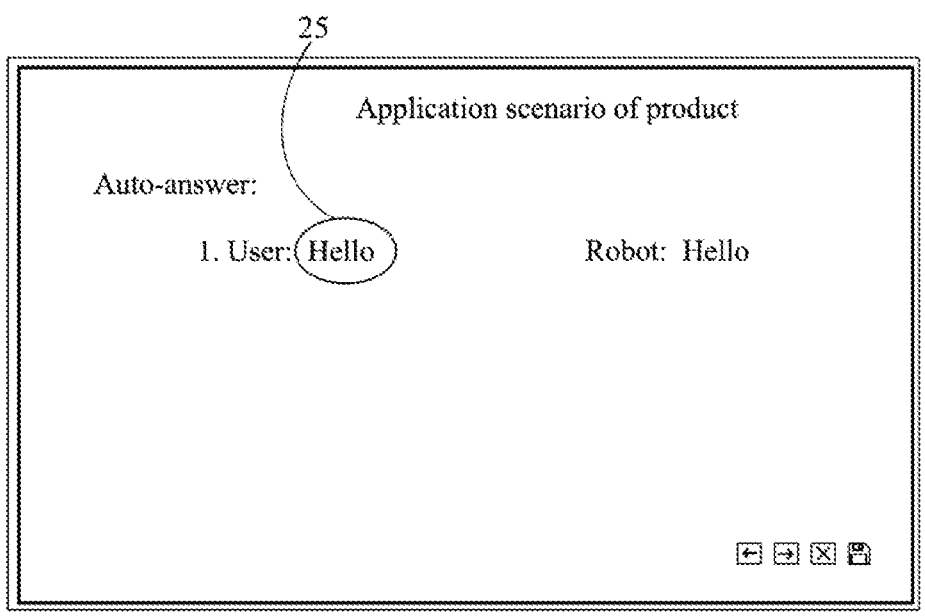
FIG. 31 is a schematic diagram of a display interface of a display screen of an interactive whiteboard provided in another embodiment of the disclosure.

For example, FIG. 30 is a schematic diagram of the display interface of the display screen of the interactive whiteboard provided in another embodiment. Referring to FIG. 30, an annotation track 24 inputted by the user is displayed in the display screen. In an embodiment, it is determined that the first annotation track 24 is elliptical, and the major axis and the minor axis of the ellipse are determined according to the size of the first annotation track 24, thereby obtaining the standard print formats. FIG. 31 is a schematic diagram of the display interface of the display screen of the interactive whiteboard provided in another embodiment. Referring to FIG. 31, the annotation track in the display screen is replaced with a standard print formats 25.

Figure 32:
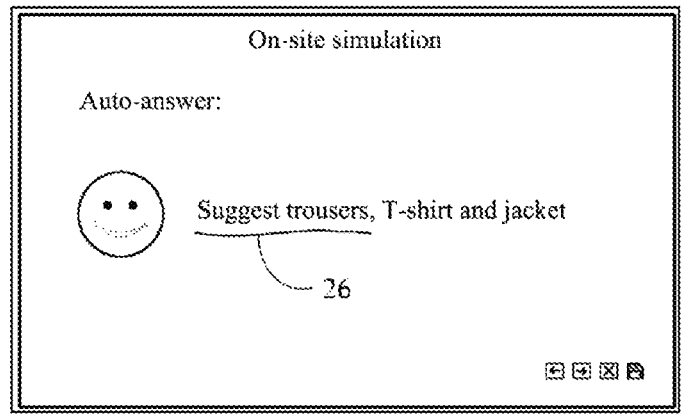
FIG. 32 is a schematic diagram of a display interface of a display screen of an interactive whiteboard provided in another embodiment of the disclosure.
Figure 33:
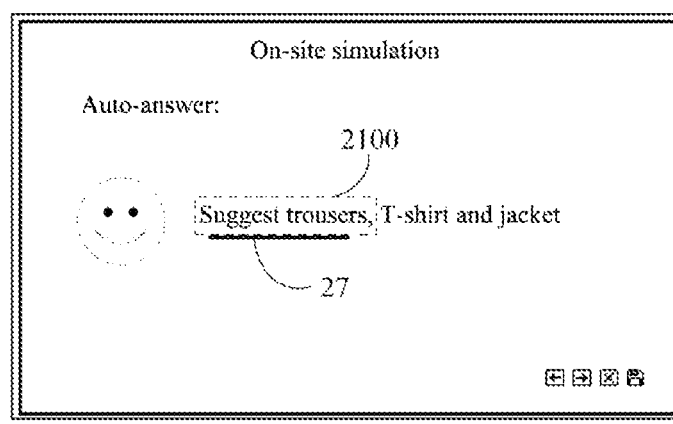
FIG. 33 is a schematic diagram of a display interface of a display screen of an interactive whiteboard provided in another embodiment of the disclosure.

For another example, FIG. 32 is a schematic diagram of the display interface of the display screen of the interactive whiteboard provided in another embodiment. Referring to FIG. 32, an annotation track 26 inputted by the user is displayed in the display screen. In an embodiment, it is determined that the annotation track 26 is an unsmooth straight line, and then the annotation track 26 is smoothed to obtain a smooth straight line. FIG. 33 is a schematic diagram of the display interface of the display screen of the interactive whiteboard provided in another embodiment. Referring to FIG. 33, the annotation track in the display screen is replaced with the converted result 27, that is, the unsmooth straight line is erased, and the smooth straight line is displayed at the corresponding position.

In this embodiment, all of the annotation tracks mentioned in the subsequent steps are standard print formats.

Step 2150: determining the corresponding pixel position according to the annotation position of the annotation track on the display interface.

In an embodiment, the display screen realizes the display by changing the pixel values of multiple pixel points. In an embodiment, the pixel point is the smallest unit for independently displaying colors. When the resolution of the display screen is 1208×1024, it indicates that the display screen has 1028×1024 pixel points in total. In an embodiment, the pixel point positions for displaying the annotation track in the display screen can be determined according to the annotation position.

Figure 34:
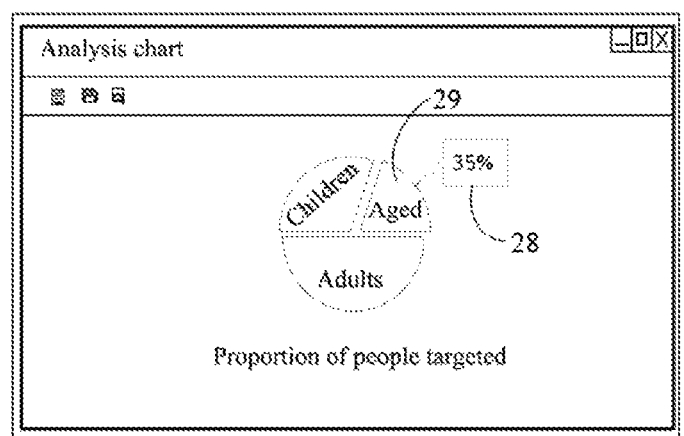
FIG. 34 is a schematic diagram of a display interface of a display screen of an interactive whiteboard provided in another embodiment of the disclosure.

Considering that the user may annotate certain display content in a blank space around the display content in actual applications, at this time, the annotation position is different from the pixel positions of the display content; and therefore, the pixel positions which correspond to different annotation tracks and annotation positions are preset. In an embodiment, the pixel positions are the positions where the pixel points of the annotated content are located, and the determining of the pixel positions depends on the pixel point positions for displaying the annotation track. For example, referring to FIG. 31, the annotation track is determined as a trajectory of circling according to the annotation position, and at this time, the area inside the annotation track is determined as the pixel positions. In another example, FIG. 34 is a schematic diagram of the display interface of the display screen of the interactive whiteboard provided in another embodiment. Referring to FIG. 34, it is determined according to the annotation position that the annotation track contains an annotation box 28; and at this time, a setting area 29 corresponding to the directed position of the annotation box is used as the pixel positions. For another example, referring to FIG. 33, the annotation track is determined to be a straight line or a curve according to the annotation position, and then a setting area 2100 above the annotation position is used as the pixel positions. That is, according to the annotation position, the setting area around the annotation position is selected as the pixel positions. Generally speaking, the pixel positions contain a plurality of pixel point positions.

Step 2160: obtaining image data corresponding to the pixel positions when the screen sharing data is displayed on the display interface.

In an embodiment, the image data is the pixel values corresponding to a plurality of pixel points in the pixel positions when displaying the screen sharing data. In an embodiment, the pixel value is a red, green, and blue value, that is, an RGB value. The pixel values of the plurality of pixel points in the pixel positions and the mutual positional relationship between the pixel values are used as the recognition result.

In an embodiment, in order to ensure the accuracy of the subsequent tracking of annotations, after the image data is recognized, the integrity of the image data can be determined. In the event that the image data is incomplete, the pixel positions can be changed to obtain complete image data. In an embodiment, the manner of recognizing the integrity of the image data includes, but not limited to, such as a machine learning method. For example, after the image data is determined, the specific display content of the image data is recognized as half of a character. At this time, the pixel positions are changed so as to determine the image data as a complete character.

Step 2170: detecting whether the pixel value corresponding to at least one pixel point on the display interface changes or not. If it is detected that the pixel value corresponding to the at least one pixel point on the display interface has changed, execute the step 2180; if it is not detected that the pixel value corresponding to the pixel point on the display interface changes, return to and execute the step 2170.

In an embodiment, when the screen sharing data is displayed on the display interface, the pixel value of each pixel point in the previous frame of screen sharing data is compared with the pixel value of the corresponding pixel point of the current frame of screen sharing data. If the pixel value of at least one pixel point changes, it is confirmed that the display content of the screen sharing data has changed, that is, the screen sharing data has changed on the display interface. If the pixel values of all pixel points have not changed, this step is repeated. Generally speaking, this step is repeated during a complete screen sharing process, that is, it is detected in real time during the screen sharing whether the screen sharing data changes on the display interface.

Step 2180: determining that the screen sharing data changes on the display interface.

Step 2190: tracking the image data, and controlling the annotation track to change synchronously according to the tracking result, so that the relative positional relationship between the annotation track and the image data is fixed.

In an embodiment, when the screen sharing data changes on the display interface, the image data is tracked in real time, so as to determine the changed track of the image data during the change of the screen sharing data, thereby controlling the annotation track to change synchronously according to the change trajectory. Typically, during the change of the screen sharing data, the relative positional relationship between the annotation track and the image data is fixed.

In an embodiment, the specific manner of tracking the image data is to: determine pixel positions having the same image data in the next frame of screen sharing data displayed on the display interface, and select a pixel position closest to the pixel positions of the current screen sharing data as the changed position of the image data, so as to obtain the changed track.

Step 2200: confirming whether an end instruction is received or not. If the end instruction is received, execute the step 2210; otherwise, if the end instruction is not received, return to and execute the step 2110.

In an embodiment, the end instruction is used to notify the interactive whiteboard of stopping receiving and stopping displaying the screen sharing data. The end instruction is triggered by the user through the associated client, or triggered by the user on the interactive whiteboard. The form of the end instruction and the triggering rule are not limited in this embodiment.

Step 2210: saving the display data and the annotation track on the display interface in association.

Because the display data on the display interface is the data obtained after the screen sharing data is zoomed in or out according to the screen sharing relation, when the saving is performed, only the display data and the annotation track having the same resolution as the display screen, rather than the screen sharing data and the annotation track, are saved.

In an embodiment, the data of the first display layer and that of the second display layer are superimposed to realize the saving of the display data and the annotation track in association. Or, the first display layer and the second display layer are saved separately, and when the saved data is displayed, the first display layer and the second display layer are superimposed and displayed so as to realize the editability of the annotation track.

In an embodiment, the saved data is transmitted to the associated client or other clients. At this time, when the saved data is opened in the associated client or other clients, the saved data needs to be converted to adapt to the resolution of the display screen currently used.

In the technical solution provided in this embodiment, the screen sharing data is displayed on the display interface of the second display layer; in the first display layer overlaying the second display layer, the annotation track generated based on the touch operation is displayed and reshaped; then the image data corresponding to the annotation track is determined on the display interface; when the pixel value of the pixel point on the display interface changes, it is determined that the screen sharing data changes on the display interface; correspondingly, the image data is tracked in real time, and the annotation track is controlled to change synchronously with the image data; and when the end instruction is received, the display data and the annotation track are saved in association. In this way, the addition of the annotation to the screen sharing data is realized; the annotation track is converted into the standard print formats, which beautifies the user's viewing interface and improves the user's viewing comfort; by using the image recognition technology, it is ensured that the annotation track changes synchronously with the change of the corresponding image data; and the annotation track can be recorded, which accurately restores the annotation scenario.

Considering that a certain frame of the annotated screen sharing data may reappear on the display interface in actual applications, at this time, it is necessary for the corresponding annotation track to be displayed synchronously. In order to satisfy the above scenario, this embodiment further includes:

Step 2220: saving the first correspondence between the image data and the annotation track.

In this embodiment, the saving manner includes, but not limited to, such as adding a tag to the image data, and adding the same tag to the annotation track synchronously. In this embodiment, the advantage of saving the first correspondence is that the association between the annotation track and the screen sharing data is established. It can be guaranteed that the corresponding annotation track reappears according to the first correspondence when the image data reappears on the display interface.

Step 2230: synchronously displaying the annotation track according to the first correspondence when the image data reappears on the display interface.

In an embodiment, it is determined according to the first correspondence in real time whether the newly appearing screen sharing data contains the image data corresponding to the annotation track or not. If so, the image data and the corresponding annotation track are determined.

In an embodiment, if the image data is only partially displayed on the display interface for some reason, for example, during the process of switching the display content by the associated client, only a part of the image data is displayed for a certain frame of the screen sharing data, while a ratio value is set. If the ratio of the number of pixel points of the displayed part of the image data to the total number of pixel points of the image data is greater than or equal to the ratio value, the annotation track is controlled to change synchronously. If the ratio of the number of pixel points of the displayed part of the image data to the total number of pixel points of the image data is less than the ratio value, it is determined that the image data disappears from the display interface, and at this time, the annotation track is controlled to disappear synchronously.

Embodiment VII

Figure 35:
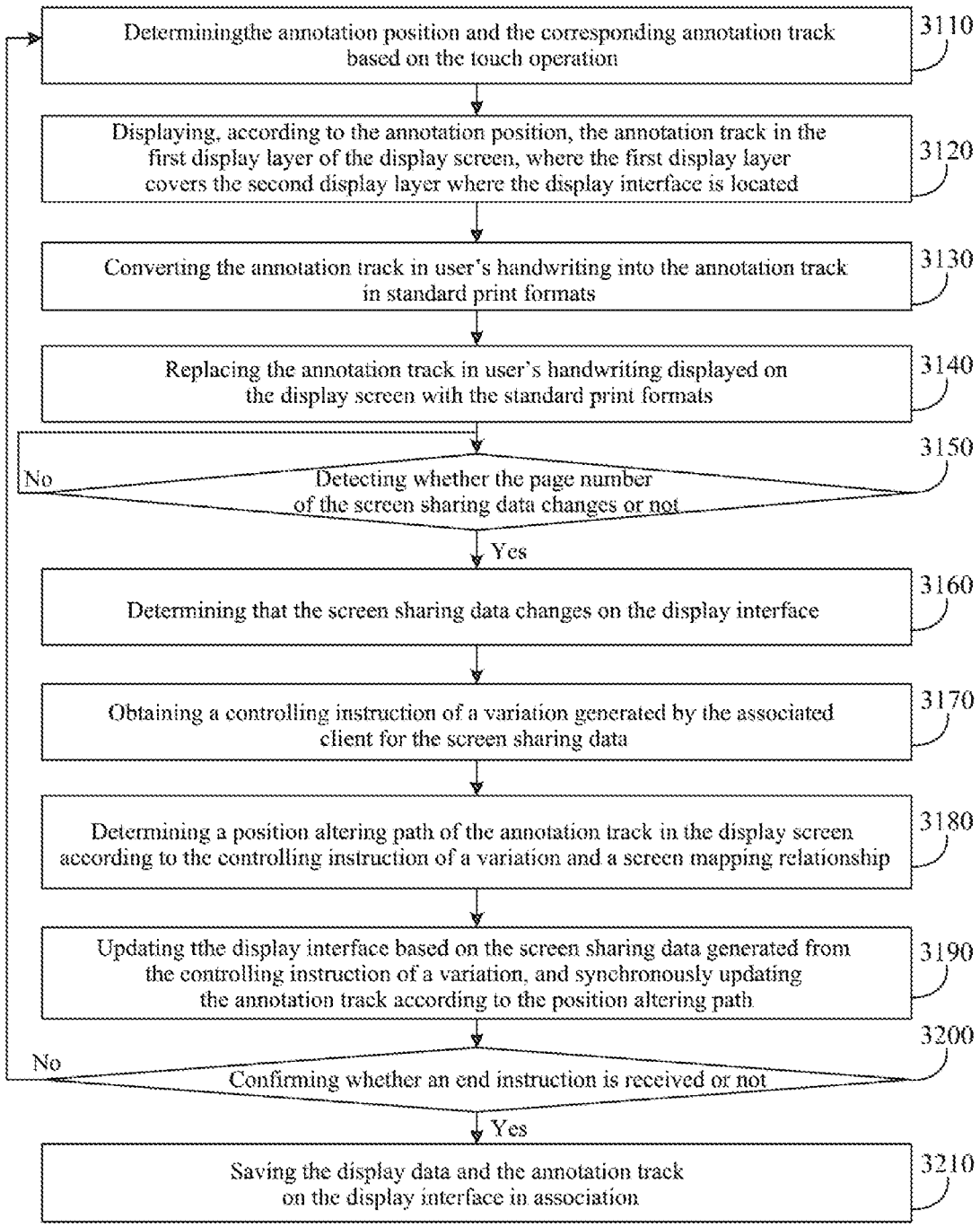
FIG. 35 is a flowchart of a method of providing annotation track on the content displayed on an interactive whiteboard provided in another embodiment of the disclosure.

FIG. 35 is a flowchart of an method of providing annotation track on the content displayed on an interactive whiteboard provided in another embodiment. The method of providing annotation track on the content displayed on an interactive whiteboard provided in this embodiment is described based on the above embodiments. Referring to FIG. 35, the method of providing annotation track on the content displayed on an interactive whiteboard provided in this embodiment includes the following steps.

Step 3110: determining the annotation position and the corresponding annotation track based on the touch operation.

Step 3120: displaying, according to the annotation position, the annotation track in the first display layer of the display screen, where the first display layer overlays the second display layer where the display interface is located.

Step 3130: converting the annotation track in user's handwriting into the annotation track in standard print formats.

Step 3140: replacing the annotation track in user's handwriting displayed on the display screen with the standard print formats.

Step 3150: detecting whether the page number of the screen sharing data changes or not. If it is detected that the page number of the screen sharing data changes, execute the step 3160. If it is not detected that the page number of the screen sharing data changes, return to and execute the step 3150.

In an embodiment, when the screen sharing data is a PTT, the associated client will notify the interactive whiteboard of the number of total pages of the PPT and the page number of the currently displayed page of the PPT. When the screen sharing data is screenshot data, the interactive whiteboard or the associated client creates the page number for the screen sharing data by itself. For example, each frame of the screenshot data corresponds to a page number; or, the screenshot data which is obtained in continuous time and includes multiple pixel points having the same pixel values corresponds to a page number. At this time, both the interactive whiteboard and the associated client can clearly capture the page number corresponding to the screenshot data.

In an embodiment, when the screen sharing data is displayed on the display interface, the page number of the current screen sharing data is recorded. When the page number changes, it is determined that the screen sharing data changes on the display interface. If the page number does not change, this step is repeated. Typically, this step is repeated during a complete screen sharing process. That is, it is detected in real time during the screen sharing whether the screen sharing data changes on the display interface.

Step 3160: determining that the screen sharing data changes on the display interface.

Step 3170: obtaining a controlling instruction of a variation generated by the associated client for the screen sharing data.

In an embodiment, the controlling instruction of a variation is an instruction generated by the associated client when the user controls the associated display screen. According to the controlling instruction of a variation, the targeted display window and controlling operation can be determined, such as, by sliding the display data of the display window A upward, sliding the display data of the display window B downward, moving the display window A, displaying the display window B in full screen, or the like. In this embodiment, the manner of controlling the associated display screen by the user is not limited in this embodiment. In an embodiment, the interactive whiteboard can obtain the controlling instruction of a variation in real time.

Step 3180: determining a position altering path of the annotation track in the display screen according to the controlling instruction of a variation and a screen sharing relation.

In an embodiment, the screen sharing relation is determined according to the resolution of the associated display screen of the associated client and the resolution of the display screen. For example, the resolution of the associated display screen is 320×240, and the resolution of the display screen is 640×480. At this time, the screen sharing relation is that the pixel value of one pixel point in the associated display screen is displayed at four pixel points at the corresponding position in the display screen.

In an embodiment, according to the controlling instruction of a variation, the changing rule for the corresponding data in the associated display screen can be determined, such as sliding upward by 5 rows of pixel points, shifting the display window to the left by 10 pixel points, and the like. In an embodiment, the corresponding altering path when the annotation track performs the same operation as the changing rule in the display screen is determined according to the screen sharing relation. For example, the resolution of the associated display screen is 320×240, and the resolution of the display screen is 640×480. According to the controlling instruction of a variation, it is determined that the display window is shifted to the left by 10 pixel points; at this time, it is determined according to the screen sharing relation that the annotation track needs to be shifted to the left by 20 pixel points, that is, the altering path of the annotation track is to shift to the left by 20 pixel points.

In an embodiment, this step 3180 includes the following steps.

Step 30810: determining, according to the controlling instruction of a variation, the target window in the screen sharing data and the change controlling operation for the target window.

In an embodiment, the controlling instruction of a variation includes a controlling position and a controlling amplitude. The interactive whiteboard can determine the corresponding target window in the screen sharing data according to the controlling position, and meanwhile determines the change controlling operation for the target window according to the controlling amplitude. For example, the controlling instruction of a variation includes a cursor position of a mouse and the scroll times and scroll directions of the mouse wheel. The interactive whiteboard determines, in the screen sharing data, a display window where the cursor position is located as the target window, and the scroll times and scroll directions of the mouse wheel as the controlling amplitude.

Step 30820: determining a mapped position in the associated display screen for the annotation position of the annotation track according to the screen sharing relation.

Step 30830: determining whether the target window contains the mapped position or not. If the target window contains the mapped position, execute the step 30840. If the target window does not contain the mapped position, maintain the annotation position unchanged, and return to and execute the step 3110.

In an embodiment, the location area of the target window is determined in the screen sharing data, and it is determined whether the mapped position is within the location area or not. If the mapped position is within the location area, it means that the mapped position may change when the change controlling operation is performed on the target window. If the mapped position is not within this location area, it means that the mapped position will not change when the change controlling operation is performed on the target window.

Step 30840: determining a change path of the mapped position when the change controlling operation is performed on the target window, and determining, according to the screen sharing relation and the change path, the position altering path of the annotation track on the display interface.

In an embodiment, the control for the target window is simulated according to the change controlling operation, and then the change path of the mapped position is determined. For example, the interactive whiteboard calculates the height, width, and position of the target window, and controls the target window according to the scroll times and the scroll directions; obtains the change path of the mapped position in the target window according to the sampling frequency of the screen sharing data, and then maps the change path into the display interface according to the screen sharing relation, so as to obtain the position altering path.

Step 3190: updating the display interface based on the screen sharing data generated from the controlling instruction of a variation, and synchronously updating the annotation track according to the position altering path.

When the screen sharing data is displayed frame by frame on the display interface, the control process of the controlling instruction of a variation for the associated display screen can be reflected. Correspondingly, synchronously updating the annotation position of the annotation track according to the position altering path can ensure that the annotation track changes synchronously with the change of the screen sharing data on the display interface. Typically, the sampling frequency of the position altering path is the same as that of the screen sharing data.

Step 3200: confirming whether an end instruction is received or not. If the end instruction is received, execute the step 3210; otherwise, if the end instruction is not received, return to and execute the step 3110.

Step 3210: saving the display data and the annotation track on the display interface in association.

In the technical solution provided in this embodiment, the screen sharing data is displayed on the display interface of the second display layer; the annotation track generated based on the touch operation is displayed on the first display layer overlapping the second display layer; the annotation track is converted into the standard print formats; when the page number of the screen sharing data changes, it is determined that the screen sharing data changes on the display interface, at this time, the altering path of the annotation position is determined according to the controlling instruction of a variation transmitted by the associated client and the screen sharing relation; the annotation position is updated synchronously according to the altering path when the screen sharing data of the display interface is updated; and when the end instruction is received, the display data and the annotation track are saved in association. In this way, the addition of the annotation to the screen sharing data is realized in real time; the annotation track is converted into the standard print formats, which improves the user's viewing comfort; by using the coordinate mapping technology, it is ensured that the annotation track changes synchronously with the change of the corresponding screen sharing data; and the annotation track can be recorded, and the annotation scenario is accurately restored.

Considering that a certain frame of the annotated screen sharing data may reappear on the display interface in actual applications. Correspondingly, the corresponding annotation track may need to be displayed synchronously. In order to satisfy the above scenario, this embodiment further includes the following steps.

Step 3220: determining the page number of the screen sharing data, and saving the second correspondence between the page number and the annotation track.

In an embodiment, the manner of saving the second correspondence may be referred to the manner of saving the first correspondence. The description is not repeated here.

Step 3230: synchronously displaying the annotation track according to the second correspondence, when the screen sharing data corresponding to the page number is displayed on the display interface again.

In an embodiment, when the page number of the screen sharing data changes, the annotation track and the annotation position corresponding to the current page number are determined according to the second correspondence, and the screen sharing data and the annotation track corresponding to the current page number are displayed on the display screen. In an embodiment, the annotation track is saved when the page number is saved.

In an embodiment, when the screen sharing data and the annotation track change synchronously, both the corresponding page number and the annotation position change. At this time, the second correspondence is updated synchronously. When the screen sharing data of a certain page number is displayed again, it is only necessary to display the annotation track synchronously according to the second correspondence, without any other calculation.

The technical solution provided in this embodiment is exemplarily described as follow.

FIG. 6 is referred to for the interactive system used in this example. A screen sharing service application is installed in the interactive whiteboard 1 and the laptop computer 2, respectively. In this embodiment, the screen sharing service application in the laptop computer 2 captures screenshots of the display pictures of the associated display screen according to the sampling frequency to generate screen sharing data, and transmits the screen sharing data and the controlling instruction of a variation corresponding to the screen sharing data to the screen sharing service application in the interactive whiteboard 1 synchronously. The operations related to the laptop computer and interactive whiteboard described below are the operations performed by the respective screen sharing service applications.

Figure 36:
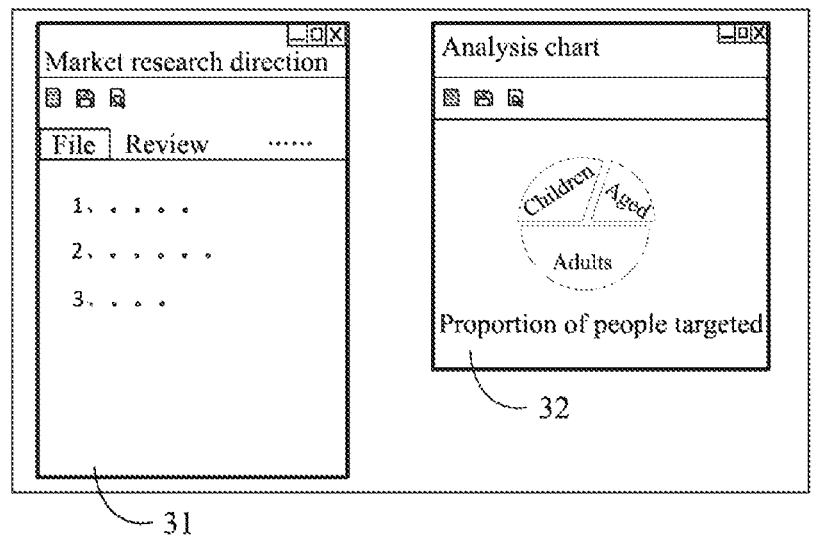
FIG. 36 is a schematic diagram of a display picture of an associated display screen of an associated client provided in another embodiment of the disclosure.
Figure 37:
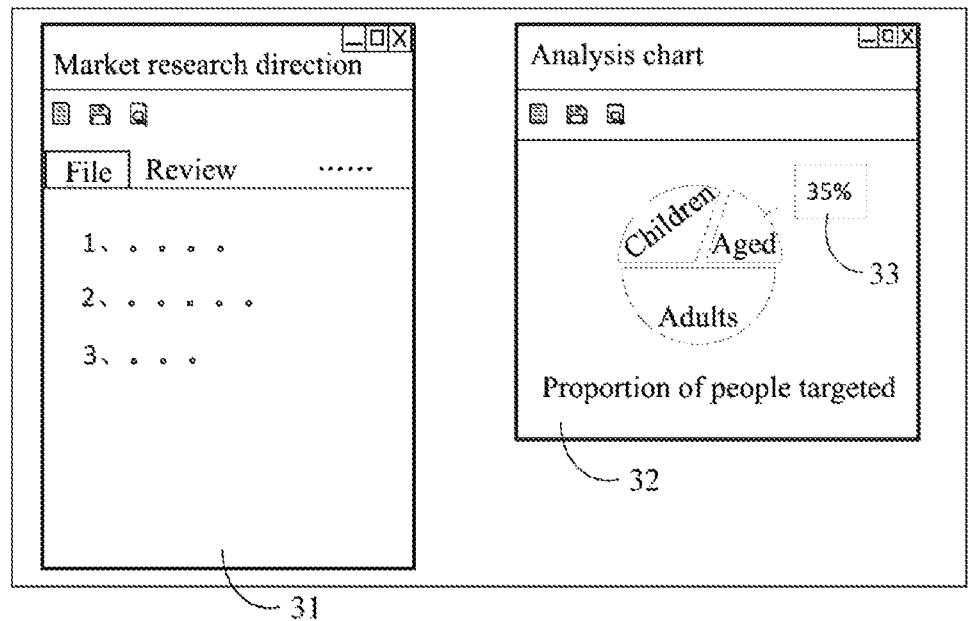
FIG. 37 is a schematic diagram of a display interface of a display screen of an interactive whiteboard provided in another embodiment of the disclosure.

FIG. 36 is a schematic diagram of the display picture of the associated display screen of the associated client provided in another embodiment. The laptop computer 2 captures a screenshot of the display picture to generate a frame of screen sharing data and transmits the same to the interactive whiteboard 1. The interactive whiteboard 1 processes the screen sharing data according to the screen sharing relation, and transmits the processed data to the display screen for display in the second display layer. Referring to FIG. 36, the current screen sharing data is displayed on the display interface, where it is determined that the display picture of the laptop computer 2 includes a first window 31 and a second window 32. At this time, the user makes an annotation on the side of the interactive whiteboard 1. FIG. 37 is a schematic diagram of the display interface of the display screen of the interactive whiteboard according to another embodiment. Referring to FIG. 37, an annotation track 33 is displayed in the first display layer. In order to facilitate data recording, an identification is created for the annotation track 33, which is denoted as 1ID; at the same time, the page number of the current screen sharing data is denoted as 2ID. In an embodiment, the interactive whiteboard 1 records the annotation track 33, the annotation position, 1ID and 2ID, and establishes the second correspondence. At the same time, the interactive whiteboard 1 determines according to the annotation position and the screen sharing relation that the annotation track 33 belongs to the second window 32.

Figure 38:
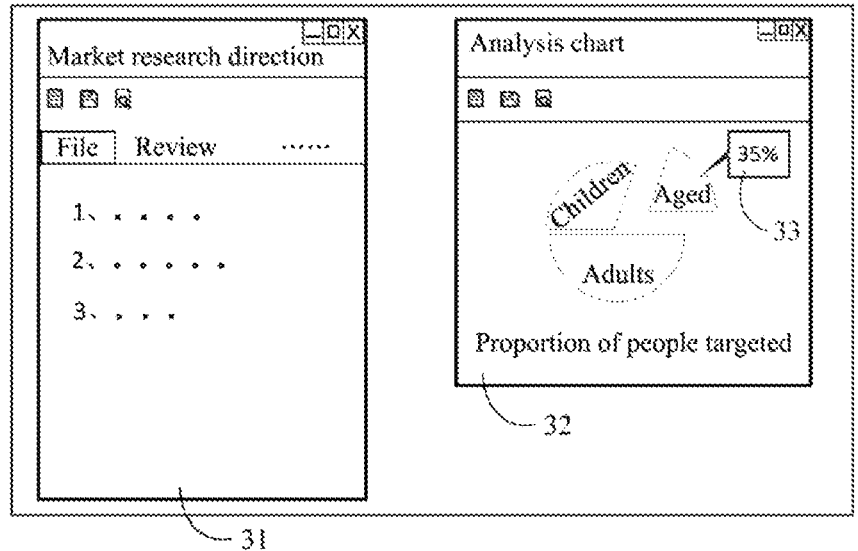
FIG. 38 is a schematic diagram of a display interface of a display screen of an interactive whiteboard provided in another embodiment of the disclosure.

When the user issues, on the laptop computer 2, a first controlling operation for the display picture of FIG. 36, the interactive whiteboard 1 obtains the controlling instruction of a variation transmitted by the laptop computer 2, filters and recognizes the controlling instruction of a variation, and determines that the target window is a second window 32 and the change controlling operation for the second window 32 is to move a certain graphic in the second window 32. After that, the interactive whiteboard 1 determines that the annotation track 33 is within the second window 32, and determines a position altering path of the annotation position of the annotation track 33 on the display interface according to a screen mapping rule. At this time, the associated display screen changes the display content according to the controlling instruction of a variation, where when executing the controlling instruction of a variation, the laptop computer 2 captures a screenshot of the display picture of the associated display screen at a certain sampling time to generate the screen sharing data. The interactive whiteboard 1 updates the display interface synchronously according to the corresponding screen sharing data. FIG. 38 is a schematic diagram of a ninth display interface of the display screen of the interactive whiteboard according to another embodiment. Referring to FIG. 38, when the display interface is updated, the annotation position of the annotation track 33 is synchronously updated according to the position altering path. Correspondingly, the page number and the annotation position of the current screen sharing data is determined, and the second correspondence is updated, so that when the interactive whiteboard displays the display interface of FIG. 38 again, only the second correspondence needs to be retrieved and the follow display of the annotation track can be realized.

Figure 39:
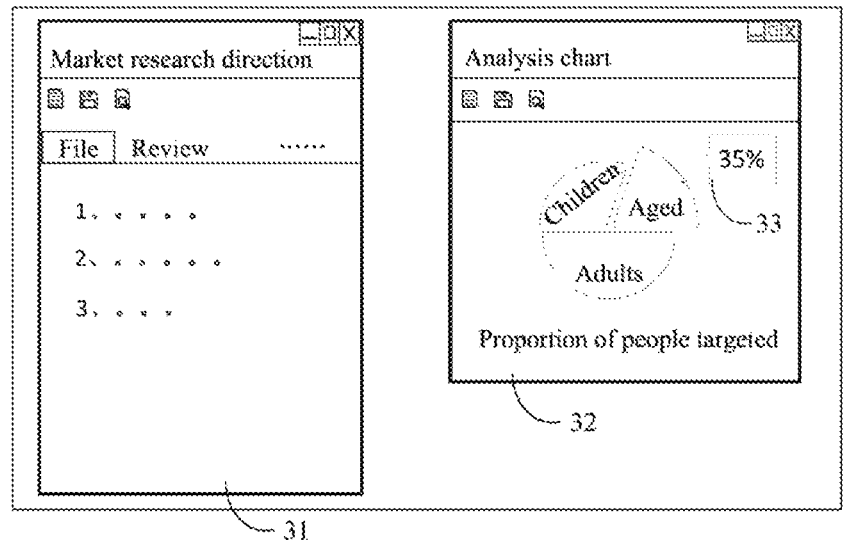
FIG. 39 is a schematic diagram of a display interface of a display screen of interactive whiteboard provided in another embodiment of the disclosure.

When the user issues, on the laptop computer 2, a second controlling operation for the display picture of FIG. 36, the interactive whiteboard 1 obtains the controlling instruction of a variation transmitted by the laptop computer 2, filters and recognizes the controlling instruction of a variation, and then determines that the target window is the second window 32 and the change controlling operation for the second window 32 is to zoom out a certain graphic in the second window 32. After that, the interactive whiteboard 1 determines the annotation position of the annotation track 33 in the second window 32, and determines the position altering path of the annotation position of the annotation track 22 on the display interface according to the screen mapping rule. At this time, the associated display screen changes the display content according to the controlling instruction of a variation, where when executing the controlling instruction of a variation, the laptop computer 2 captures a screenshot of the display picture of the associated display screen at a certain sampling time to generate the screen sharing data. The interactive whiteboard 1 updates the display interface synchronously according to the corresponding screen sharing data. FIG. 39 is another schematic diagram of a tenth display interface of the display screen of the interactive whiteboard. Referring to FIG. 39, when the display interface is updated, the annotation position of the annotation track 22 is updated synchronously according to the altering path. Correspondingly, the annotation track is zoomed out synchronously.

Embodiment VIII

Figure 40:
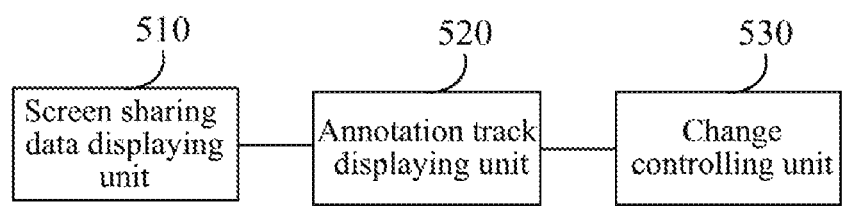
FIG. 40 is a schematic structural diagram of an annotation displaying apparatus provided in an embodiment of the disclosure.

FIG. 40 is a schematic structural diagram of an annotation displaying apparatus provided in an embodiment. Referring to FIG. 40, the annotation displaying apparatus provided in this embodiment includes a screen sharing data displaying unit 510, an annotation track displaying unit 520, and a change controlling unit 530, where the screen sharing data displaying unit 510 is configured to display screen sharing data; the annotation track displaying unit 520 is configured to display an annotation track, where the annotation track is generated based on an annotation command or a touch operation; the change controlling unit 530 is configured to control the annotation track to change synchronously with a change of corresponding screen sharing data on the display interface.

The annotation displaying apparatus provided in this embodiment realized the annotating for the screen sharing data on the end device that displays the screen sharing data under the screen sharing scenario, and at the same time ensured that the annotation changes synchronously with the change of the screen sharing data and improves the user's experience.

In an embodiment, the screen sharing data displaying unit 510 includes: a first receiving module, configured to receive a command to display content of screen sharing; a first displaying module, configured to display a first content of screen sharing. The annotation track displaying unit 520 includes: a second receiving module, configured to receive a first annotation command, where the first annotation command is used to annotate the first content of screen sharing; a second displaying module, configured to display the first annotation track, where the first annotation track is generated according to the first annotation command. The apparatus further includes: a third receiving module, configured to receive a request to turn pages forward, where the request to turn pages forward is used to control the first content of screen sharing to be turned forward; a third displaying module, configured to display a second content of screen sharing after turning the page. The change controlling unit 530 includes: a fourth receiving module, configured to receive a input to turn pages backward, where the input to turn pages backward is used to control the second content of screen sharing to be turned backward; a fourth displaying module, configured to display the first content of screen sharing and the first annotation track on the display interface.

Figure 41:
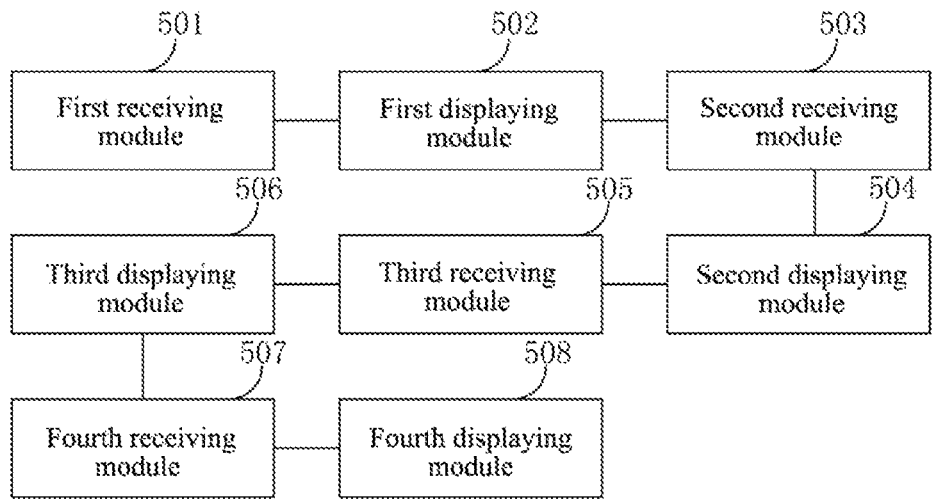
FIG. 41 is a schematic structural diagram of an annotation displaying apparatus provided in another embodiment of the disclosure.

FIG. 41 is a schematic structural diagram of an annotation displaying apparatus provided in another embodiment. The annotation displaying apparatus provided in this embodiment may be integrated in an annotation displaying device. The annotation displaying device may include two or more physical entities or one physical entity. The annotation displaying device may be a computer, a mobile phone, a tablet, a projector, an interactive whiteboard or the like.

Referring to FIG. 41, the annotation displaying apparatus provided in this embodiment includes: a first receiving module 501, a first displaying module 502, a second receiving module 503, a second displaying module 504, a third receiving module 505, a third displaying module 506, a fourth receiving module 507 and a fourth displaying module 508.

In an embodiment, the first receiving module 501 is configured to receive a command to display content of screen sharing; the first displaying module 502 is configured to display a first content of screen sharing; the second receiving module 503 is configured to receive a first annotation command, which is used to annotate the first content of screen sharing; the second displaying module 504 is configured to display the first annotation track, which is generated according to the first annotation command; the third receiving module 505 is configured to receive a request to turn pages forward, which is used to control the first content of screen sharing to be turned forward; the third displaying module 506 is configured to display a second content of screen sharing after turning the page; the fourth receiving module 507 is configured to receive a input to turn pages backward, which is used to control the second content of screen sharing to be turned backward; the fourth displaying module 508 is configured to display the first content of screen sharing and the first annotation track.

The technical solution provided in this embodiment uses the technical means of: receiving the command to display content of screen sharing, and displaying the first content of screen sharing; displaying the first annotation track when receiving the first annotation command; executing the page turning operation after receiving the request to turn pages forward, and displaying the second content of screen sharing; and displaying the first content of screen sharing and the first annotation command again after receiving the input to turn pages backward. In this way, the annotating for the first content of screen sharing under the screen sharing scenario is achieved; and when the first content of screen sharing appears on or disappears from the display screen of the interactive whiteboard, the first annotation track appears or disappears synchronously, which guarantees the synchronous change of the first content of screen sharing and the first annotation track.

Based on the above embodiments, the annotation displaying apparatus further includes: a fifth receiving module, configured to receive an annotation trigger instruction before the first annotation command is received, where the annotation trigger instruction is used to start an annotation function.

Based on the above embodiments, the annotation displaying apparatus further includes: a sixth receiving module, configured to receive a second annotation command after the second content of screen sharing after turning the page is displayed, where the second annotation command is used to annotate the second content of screen sharing; a fifth displaying module, configured to display a second annotation track, which is generated according to the second annotation command.

Based on the above embodiments, the annotation displaying apparatus further includes: a seventh receiving module, configured to receive the request to turn pages forward after the first content of screen sharing and the first annotation track is displayed, where the request to turn pages forward is used to control the first content of screen sharing to be turned forward; a sixth displaying module, configured to display the second content of screen sharing and the second annotation track.

Based on the above embodiments, the first content of screen sharing is displayed in a first display layer, and the first annotation track is displayed in a second display layer.

Based on the above embodiments, the second display layer covers the first display layer.

Based on the above embodiments, the annotation displaying apparatus further includes: a shaping module, configured to shape the first annotation track after the first annotation track is displayed to obtain a standard print formats; a trajectory replacing module, configured to replace the first annotation track with the standard print formats.

Based on the above embodiments, the annotation displaying apparatus further includes: a pixel point determining module, configured to determine a position of a pixel point displaying the first annotation track after the first annotation track is displayed; an image determining module, configured to recognize image data displayed corresponding to the position of the pixel point in the first content of screen sharing. The fourth displaying module 508 includes: an image tracking unit, configured to display the first content of screen sharing and track the image data during the displaying; a trajectory displaying unit, configured to display the first annotation track synchronously according to a tracking result, so that the relative position between the first annotation track and the image data is fixed.

Based on the above embodiments, the annotation displaying apparatus further includes: a first relationship saving module, configured to save a first correspondence between the image data and the first annotation track after the image data displayed corresponding to the position of the pixel point is recognized in the first content of screen sharing. The annotation displaying apparatus further includes: an image recognizing module, configured to recognize the image data in the first content of screen sharing before the first content of screen sharing is displayed and the image data is tracked during the displaying; a trajectory determining module, configured to determine the first annotation track corresponding to the image data according to the first correspondence.

Based on the above embodiments, the annotation displaying apparatus further includes: an instruction obtaining module, configured to obtain a controlling instruction of a variation generated for the first content of screen sharing after the first content of screen sharing and the first annotation track are displayed; a rule determining module, configured to determine, according to the controlling instruction of a variation, a trajectory changing rule for displaying the first annotation track; a trajectory updating module, configured to update the first content of screen sharing, and synchronously update the first annotation track according to the trajectory changing rule.

Based on the above embodiments, the rule determining module includes: a window determining unit, configured to determine, in the first content of screen sharing, a target window to which the controlling instruction of a variation is targeted and a change controlling operation for the target window; a position determining unit, configured to determine an annotation position of the first annotation track; a rule confirming unit, configured to determine the trajectory changing rule for the first annotation track when the change controlling operation is performed on the target window, if the target window contains the annotation position.

Based on the above embodiments, the annotation displaying apparatus further includes: a second relationship saving module, configured to save a second correspondence between the page number of the first content of screen sharing and the first annotation track after the first annotation track is displayed. The fourth displaying module 508 includes: a page number determining unit, configured to determine the page number of the first content of screen sharing; a trajectory corresponding unit, configured to determine the first annotation track corresponding to the page number according to the second correspondence; a synchronously displaying unit, configured to synchronously display the first annotation track when the first content of screen sharing is displayed.

Based on the above embodiments, the apparatus further includes: an association saving module, configured to save the first content of screen sharing and the first annotation track in association if an end instruction is received.

In an embodiment, the screen sharing data displaying unit 510 includes: a screen sharing data displaying module, configured to display, on the display interface of the display screen, the screen sharing data transmitted by an associated client. The annotation track displaying unit 520 includes: a trajectory displaying module, configured to display, on the display interface, the annotation track generated based on the touch operation. The change controlling unit 530 includes: a synchronously changing module, configured to control the annotation track to change synchronously with the change of the corresponding screen sharing data on the display interface.

Figure 42:
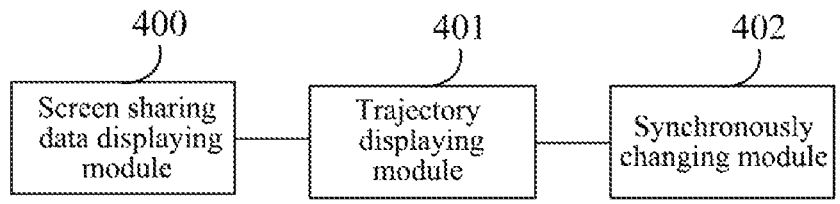
FIG. 42 is a schematic structural diagram of an annotation displaying apparatus provided in another embodiment of the disclosure.

FIG. 42 is a schematic structural diagram of an annotation displaying apparatus provided in another embodiment. Referring to FIG. 42, the annotation displaying apparatus includes: a screen sharing data displaying module 400, a trajectory displaying module 401 and a synchronously changing module 402.

The screen sharing data displaying module 400 is configured to display, on the display interface of the display screen, the screen sharing data transmitted by the associated client; the trajectory displaying module 401 is configured to display, on the display interface of the display screen, the annotation track generated based on the touch operation; the synchronously changing module 402 is configured to control the annotation track to change synchronously with the change of the corresponding screen sharing data on the display interface.

The technical solution provided in this embodiment uses the technical means of: displaying the screen sharing data transmitted by the associated client on the display interface of the display screen; displaying, on the display interface, the annotation track generated based on the user's touch operation; and controlling the annotation track to change synchronously when the screen sharing data changes on the display interface. In this way, the annotating for the screen sharing data on the end device displaying the screen sharing data under the screen sharing scenario is realized, and at the same time it is ensured that the annotation changes synchronously with the change of the screen sharing data, so that the annotating process of the end device is closer to the annotating process of the associated client, thereby improving the user's experience.

Based on the above embodiments, the trajectory displaying module 401 includes: a trajectory determining unit, configured to determine the annotation position and the corresponding annotation track based on the touch operation; a layered displaying unit, configured to display the annotation track on the first display layer of the display screen according to the annotation position, where the first display layer covers the second display layer where the display interface is located.

Based on the above embodiments, the apparatus further includes: a shaping module, configured to shape the annotation track after the annotation track generated based on the touch operation is displayed on the current display interface of the display screen, so as to obtain the standard print formats; a trajectory replacing module, configured to replace the annotation track displayed on the display screen with the standard print formats.

Based on the above embodiments, the apparatus further includes: a pixel position determining module, configured to determine a corresponding pixel position in the display screen according to the annotation position of the annotation track, before the annotation track is controlled to change synchronously with the change of the corresponding screen sharing data on the display interface; an image data determining module, configured to recognize the image data corresponding to the pixel position in the event that the screen sharing data is displayed on the display interface. The synchronously changing module 402 is configured to track the image data in the event that the screen sharing data changes on the display interface, and control the annotation track to change synchronously according to the tracking result, so that the relative positional relationship between the annotation track and the image data is fixed.

Based on the above embodiments, the apparatus further includes: a first relationship saving module, configured to save the first correspondence between the image data and the annotation track; and a first synchronously displaying module, configured to synchronously display the annotation track according to the first correspondence when the image data appears on the display interface again.

Based on the above embodiments, the synchronously changing module 402 includes: an instruction obtaining unit, configured to obtain a controlling instruction of a variation generated by the associated client for the screen sharing data; a path determining unit, configured to determine a position altering path of the annotation track in the display screen according to the controlling instruction of a variation and a screen sharing relation, where the screen sharing relation is determined according to the resolution of the associated display screen of the associated client and the resolution of the display screen; a synchronously updating unit, configured to update the display interface based on the screen sharing data generated from the controlling instruction of a variation, and synchronously update the annotation track according to the position altering path.

Based on the above embodiments, the path determining unit includes: a target determining sub-unit, configured to determine a target window in the screen sharing data and a change controlling operation for the target window according to the controlling instruction of a variation; a mapping sub-unit, configured to determine a mapped position of the annotation position of the annotation track in the associated display screen according to the screen sharing relation; an altering path determining sub-unit, configured to: if the target window contains the mapped position, determine a change path of the mapped position when the controlling instruction of a variation is performed on the target window, and determine the position altering path of the annotation track on the display interface according to the screen sharing relation and the change path.

Based on the above embodiments, the apparatus further includes: a second relationship saving module, configured to determine the page number of the screen sharing data, and save a second correspondence between the page number and the annotation track; a second synchronously displaying module, configured to synchronously display the annotation track according to the second correspondence when the screen sharing data corresponding to the page number is displayed on the display interface again.

Based on the above embodiments, the apparatus further includes: a first change detecting module, configured to determine that the screen sharing data changes on the display interface, if a change of the pixel value corresponding to at least one pixel point on the display interface is detected before the annotation track is controlled to change synchronously with the change of the corresponding screen sharing data on the display interface.

Based on the above embodiments, the apparatus further includes: a second change detecting module, configured to determine that the screen sharing data changes on the display interface, if a change of the page number of the screen sharing data is determined before the annotation track is controlled to change synchronously with the change of the corresponding screen sharing data on the display interface.

Based on the above embodiments, the apparatus further includes: a saving module, configured to save the display data on the display interface and the annotation track in association if an end instruction is received.

The annotation displaying apparatus provided above may be used to perform the method of providing annotation track on the content displayed on an interactive whiteboard provided in any of the above embodiments, and has corresponding functions and beneficial effects.

Embodiment IX

Figure 43:
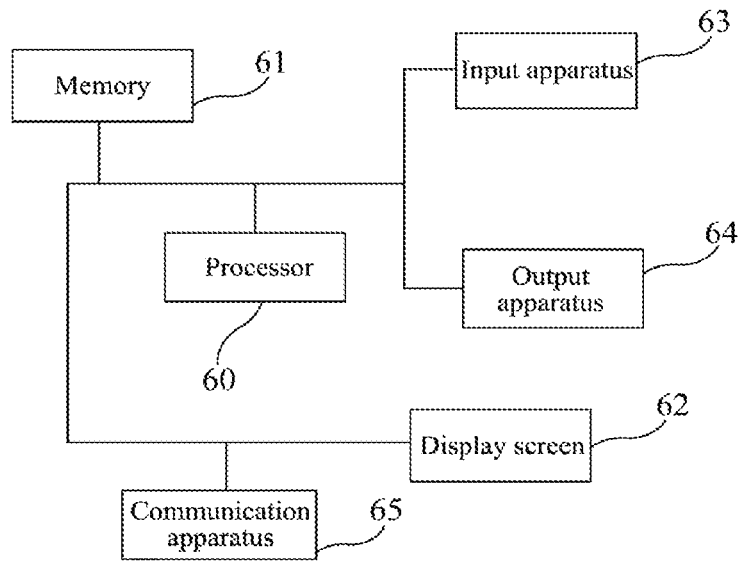
FIG. 43 is a schematic structural diagram of a computing device provided in an embodiment of the disclosure.

FIG. 43 is a schematic structural diagram of an computing device provided in an embodiment. As shown in FIG. 43, the computing device includes: a processor 60, a memory 61, a display screen 62 with a touch function, an input apparatus 63, an output apparatus 64, and a communication apparatus 65. The number of the processor 60 in the computing device may be one or more, and one processor 60 is taken as an example in FIG. 43. The number of the memory 61 in the computing device may be one or more, and one memory 61 is taken as an example in FIG. 43. The processor 60, the memory 61, the display screen 62, the input apparatus 63, the output apparatus 64, and the communication apparatus 65 of the computing device may be connected through a bus or other means. In FIG. 43, the connection through a bus is taken as an example. In an embodiment, the computing device may be a computer, a mobile phone, a tablet, a projector, an interactive whiteboard, or the like. In an embodiment, the computing device is described by taking an interactive whiteboard as an example.

As a computer readable storage medium, the memory 61 can be used to store software programs, computer-executable programs and modules, such as the program instructions/modules corresponding to the method of providing annotation track on the content displayed on an interactive whiteboard described in any embodiment of the present disclosure (for example, the first receiving module 501, the first displaying module 502, the second receiving module 503, the second displaying module 504, the third receiving module 505, the third displaying module 506, the fourth receiving module 507, and the fourth displaying module 508 of the annotation displaying apparatus). The memory 61 may mainly include a program storing area and a data storing area, where the program storing area may store an operating system and an application required for at least one function; the data storing area may store data created according to the use of the device, and the like. In addition, the memory 61 may include a high-speed random access memory, and may further include a non-volatile memory, such as at least one magnetic disk storage device, a flash memory device, or other non-volatile solid-state storage devices. In some examples, the memory 61 may further include remote memories remotely provided with respect to the processor 60, and these remote memories may be connected to the device through a network. Examples of the above network include but are not limited to: the Internet, an intranet, a local area network, a mobile communication network, and the combination thereof.

The display screen 62 is a display screen 62 with the touch function. The display screen 62 may be a capacitive display screen, an electromagnetic display screen or an infrared display screen. In an embodiment, the display screen 62 is configured to display data according to the instructions of the processor 60, and is also configured to receive a touch operation for the display screen 62 and send the corresponding signal to the processor 60 or other apparatuses. In an embodiment, when the display screen 62 is the infrared display screen, the display screen 62 further includes an infrared touch frame, which is disposed around the display screen 62. The display screen 62 may also be configured to receive an infrared signal and send the infrared signal to the processor 60 or other devices.

The communication apparatus 65 is configured to establish a communication connection with other devices. The communication apparatus 65 may be a wired communication apparatus and/or a wireless communication apparatus.

The input apparatus 63 may be configured to receive input number or character information, and generate key signal inputs related to user settings and function control of the computing device, or may be a camera configured to obtain images and a sound pickup device configured to obtain audio data. The output apparatus 64 may include audio device such as a speaker and the like. In an embodiment, the specific composition of the input apparatus 63 and the output apparatus 64 may be provided according to actual conditions.

The processor 60 executes the software programs, instructions, and modules stored in the memory 61, so as to execute at least one function application and data processing of the device, that is, to implement the above method of providing annotation track on the content displayed on an interactive whiteboard.

In an embodiment, when the processor 60 executes at least one instruction stored in the memory 61, the following operations are implemented: displaying screen sharing data; displaying an annotation track, where the annotation track is generated based on an annotation command or a touch operation; controlling the annotation track to change synchronously with a change of corresponding screen sharing data on the display interface.

In an embodiment, when the processor 60 executes at least one program stored in the memory 61, the following operations are implemented: receiving a command to display content of screen sharing; instructing the display screen 62 to display a first content of screen sharing on the display screen; instructing the display screen 62 to receive a first annotation command, where the first annotation command is used for annotating the first content of screen sharing; display the first annotation track; detecting a request to turn pages forward, where the request to turn pages forward is used for triggering the first content of screen sharing to be turned forward; instructing the display screen 62 to display a second content of screen sharing after turning the page; receiving a input to turn pages backward, where the input to turn pages backward is used for controlling the second content of screen sharing to be turn backward to the first content of screen sharing; instructing the display screen 62 to display the first content of screen sharing and the first annotation track.

Based on the above embodiments, before implementing the instructing the display screen 62 to receive the first annotation command, the at least one processor 60 further implements the following operation: receiving an annotation trigger instruction, where the annotation trigger instruction is used to start an annotation function.

Based on the above embodiments, after the instructing the display screen 62 to display the second content of screen sharing after turning the page is implemented, the at least one processor 60 further implements the following operations: instructing the display screen 62 to receive a second annotation command, where the second annotation command is used for annotating the second content of screen sharing; instructing the display screen 62 to receive and display a second annotation track, where the second annotation track is generated according to the second annotation command.

Based on the above embodiments, after the instructing the display screen 62 to display the first content of screen sharing and the first annotation track is implemented, the at least one processor 60 further implements the following operations: receiving the instruction to turn pages forward, wherein the instruction to turn pages forward is used to control the first content of screen sharing to be turned forward; instructing the display screen 62 to display the second content of screen sharing and the second annotation track.

Based on the above embodiments, when the display screen 62 displays data, there are at least two display layers, where the first content of screen sharing is displayed in the first display layer, and the first annotation track is displayed in the second display layer.

In an embodiment, the second display layer covers the first display layer.

Based on the above embodiments, after the instructing the display screen 62 to display the first annotation track is implemented, the at least one processor 60 further implements the following operations: converting the first annotation track in user's handwriting into the annotation track in standard print formats; instructing the display screen 62 to display the annotation track in standard print formats substitute for the first annotation track in user's handwriting.

Based on the above embodiments, after the instructing the display screen 62 to display the first annotation track is implemented, the at least one processor 60 further implements the following operations: analyzing the first annotation track to obtain pixel point positions in the first annotation track; obtaining the corresponding image data in the first content of screen sharing, according to the pixel point positions in the first annotation track; wherein the displaying the first content of screen sharing and the first annotation track after implementing the input, comprises: displaying the first content of screen sharing, and track the image data during the display; synchronously displaying the first annotation track according to a tracking result, so that a relative position between the first annotation track and the image data is fixed.

Based on the above embodiments, after the recognizing the image data displayed corresponding to the pixel point positions in the first content of screen sharing is implemented, the at least one processor 60 further implements the following operations: saving a first correspondence between the image data and the first annotation track; wherein before displaying the first content of screen sharing and tracking the image data during the displaying, the method further comprises: obtaining the corresponding image data in the first content of screen sharing; determining the first annotation track corresponding to the image data according to the first correspondence.

Based on the above embodiments, after the instructing the display screen 62 to display the first content of screen sharing and the first annotation track is implemented, the at least one processor 60 further implements the following operations: obtaining a controlling instruction of a variation on the first content of screen sharing; determining, according to the controlling instruction of a variation, a trajectory changing rule for displaying the first annotation track; updating the first content of screen sharing, and synchronously updating the first annotation track according to the trajectory changing rule.

Based on the above embodiments, the implementation of the processor 60 determining, according to the controlling instruction of a variation, the trajectory changing rule for displaying the first annotation track includes: determining a target window to which the controlling instruction of a variation is targeted and a change controlling operation for the target window in the first content of screen sharing; determine the annotation position of the first annotation track; determining the trajectory changing rule for the first annotation track when the change controlling operation is performed on the target window, if the target window contains the annotation position.

Based on the above embodiments, after the instructing the display screen 62 to display the first annotation track is implemented, the at least one processor 60 further implements the following operations: saving a second correspondence between the page number of the first content of screen sharing and the first annotation track. In an embodiment, the processor 60 instructs the display screen 62 to display the first content of screen sharing and the first annotation track in the following manner: obtaining the page number of the first content of screen sharing; determining the first annotation track corresponding to the page number according to the second correspondence; synchronously displaying the first annotation track, when instructing the display screen 62 to display the first content of screen sharing.

Based on the above embodiments, at least one processor 60 further implements: saving the first content of screen sharing and the first annotation track in association, if an end instruction is received.

In an embodiment, when the processor 60 executes at least one program stored in the memory 61, the following operations are implemented: displaying, on the current display interface of the display screen, the annotation track generated based on the touch operation, where the display interface is used to display the screen sharing data transmitted by an associated client; controlling the annotation track to change synchronously with the change of the corresponding screen sharing data on the display interface.

The computing device provided above may be configured to perform the method of providing annotation track on the content displayed on an interactive whiteboard provided in any of the above embodiments, and has corresponding functions and beneficial effects.

Embodiment X

This embodiment provides a non-transitory readable storage medium including at least one computer-executable instructions. The computer-executable instructions are executed by a computer processor to perform an method of providing annotation track on the content displayed on an interactive whiteboard, which includes: displaying screen sharing data; displaying an annotation track, where the annotation track is generated based on an annotation command or a touch operation; controlling the annotation track to change synchronously with a change of corresponding screen sharing data on a display interface.

In an embodiment, the computer-executable instructions are executed by a computer processor to perform an the method of providing annotation track on the content displayed on an interactive whiteboard, which includes: receiving a command to display content of screen sharing; displaying a first content of screen sharing; receiving a first annotation command, where the first annotation command is used to annotate the first content of screen sharing; displaying a first annotation track, where the first annotation track is generated according to the first annotation command; receiving a request to turn pages forward, where the request to turn pages forward is used to control the first content of screen sharing to turn forward; displaying a second content of screen sharing after turning the page; receiving a input to turn pages backward, where the input to turn pages backward is used to control the second content of screen sharing to be turned backward; displaying the first content of screen sharing and the first annotation track. In an embodiment, the computer-executable instructions are executed by a computer processor to perform an method of providing annotation track on the content displayed on an interactive whiteboard, which includes: displaying, on the current display interface of a display screen, an annotation track generated based on a touch operation, where the display interface is used to display screen sharing data transmitted by an associated client; controlling the annotation track to change synchronously with a change of corresponding screen sharing data on the display interface.

For the non-transitory readable storage medium including the computer-executable instructions provided in this embodiment, the computer-executable instructions are not limited to the operations of the method of providing annotation track on the content displayed on an interactive whiteboards described above, but may also perform related operations in the method of providing annotation track on the content displayed on an interactive whiteboard provided in any embodiment of the present disclosure, and have corresponding functions and beneficial effects.

Through the above description of the embodiments, those skilled in the art can understand that the present disclosure can be implemented by software and necessary general-purpose hardware, or by hardware. Based on such understanding, the technical solutions of the present disclosure can be embodied in the form of a software product. The software product can be stored in a computer-readable storage medium, such as a computer floppy disk, a read-only memory (Read-Only Memory, ROM), a random access memory (Random Access Memory, RAM), a flash (FLASH) memory, a hard disk, an optical disc or the like, and include a plurality of instructions to cause a computer device (which may be a robot, a personal computer, a server, a network device and the like) to execute the method of providing annotation track on the content displayed on an interactive whiteboard described in any embodiment of the present disclosure.

In the above annotation displaying apparatuses, the plurality of units and modules included are only divided according to functional logic, but the division is not limited thereto, as long as the corresponding functions could be achieved; in addition, the names of the plurality of functional units are used to facilitate the distinction only, rather than to limit the protection scope of the present disclosure.

It should be understood that various parts of the present disclosure may be implemented with hardware, software, firmware, or a combination thereof. In the above embodiments, a plurality of steps or methods may be implemented with software or firmware that is stored in the memory and executed by a suitable instruction executing system, for example, if implemented by hardware, as in another implementation, being implemented by at least one of the following technologies known in the art: a discrete logic circuit with a logic gate circuit for implementing a logic function on a data signal, an application-specific integrated circuit with a suitable combinational logic gate circuit, a programmable gate array (Programmable Gate Array, PGA), a field-programmable gate array (Field-Programmable Gate Array, FPGA) and the like.

In the description of this specification, the descriptions referring to the terms "an embodiment", "some embodiments", "example", "specific example", "some examples" and the like mean the features, structures, materials, or characteristics described in conjunction with the embodiment or example are included in at least one embodiment or example of the present disclosure. In this specification, the schematic expression of the above terms does not necessarily refer to the same embodiment or example.

What is claimed is:

1. A method of providing annotation track on paginated content displayed on a whiteboard, the method comprising:
    receiving, by the whiteboard from a computing device, a first content and a page number associated with the first content;
    displaying, in a first layer of the whiteboard, the first content of screen sharing;
    receiving, by the whiteboard, a first annotation command, wherein the first annotation command is used for annotating the first content of screen sharing;
    displaying, in a second layer overlaying the first layer, a first annotation track above the first content of screen sharing, wherein the first annotation track is generated based on the first annotation command, and saving a first correspondence between the first annotation track and the page number associated with the first content of screen sharing;
    detecting a first request to turn pages forward, and synchronously removing the first sharing content of screen sharing from the first layer and the first annotation track from the second layer, wherein the first request to turn pages forward is used for triggering the first content of screen sharing to turn forward;
    displaying, in the first layer, a second content of screen sharing after performing the first request;
    detecting a second request to turn pages backward, wherein the second request is used for controlling the second content of screen sharing to turn backward to the first content of screen sharing;
    after performing the second request, synchronously displaying the first content of screen sharing and the first annotation track based on the saved first correspondence between the first annotation track and the page number associated with the first content;
    obtaining a controlling instruction of a variation generated by the computing device for the first content of screen sharing;
    determining a position altering path of the first annotation track according to the controlling instruction and a screen mapping relation, wherein the screen mapping relation is determined according a resolution of a corresponding screen of the computing device and a resolution of the whiteboard; and
    updating, on the whiteboard, the first content of screen sharing based on the controlling instruction and synchronously updating the first annotation track according to the position altering path.

2. The method of claim 1, after displaying the second content of screen sharing after performing the first request, further comprising:
    receiving a second annotation command, wherein the second annotation command is used for annotating the second content of screen sharing;
    displaying a second annotation track above the second content of screen sharing, wherein the second annotation track is generated based on the second annotation command.

3. The method of claim 2, after displaying the first content of screen sharing and the first annotation track after performing the second request, further comprising:
    detecting an instruction to turn pages forward, wherein the instruction to turn pages forward is used for trigger the first content of screen sharing to turn forward to the second content of screen sharing;
    displaying the second content of screen sharing and the second annotation track after executing the instruction.

4. The method of claim 1, after displaying the first annotation track above the first content of screen sharing, further comprising:
    converting the first annotation track in user's handwriting into the annotation track in standard print formats;
    displaying the annotation track in standard print formats as a substitute for the first annotation track in user's handwriting.

5. The method of claim 1, after displaying the first annotation track above the first content of screen sharing, further comprising:
    analyzing the first annotation track to obtain pixel point positions in the first annotation track;
    obtaining the corresponding image data in the first content of screen sharing, according to the pixel point positions in the first annotation track;
    wherein the displaying the first content of screen sharing and the first annotation track after implementing the input comprises:
    displaying the first content of screen sharing, and tracking the image data during the displaying;
    synchronously displaying the first annotation track according to a tracking result while maintaining a fixed relative position between the first annotation track and the image data.

6. The method of claim 5, after obtaining the corresponding image data in the first content of screen sharing, according to the pixel point positions in the first annotation track, further comprising:
    saving a second correspondence between the image data and the first annotation track;
    wherein before displaying the first content of screen sharing and tracking the image data during the displaying, the method further comprises:
    obtaining the corresponding image data in the first content of screen sharing;
    determining the first annotation track corresponding to the image data according to the second correspondence.

7. The method of claim 1, after displaying the first content of screen sharing and the first annotation track after implementing the input, further comprising:

obtaining a second controlling instruction of a variation on the first content of screen sharing;

determining, according to the second controlling instruction of the variation, a trajectory changing rule for displaying the first annotation track;

updating the first content of screen sharing, and synchronously updating the first annotation track according to the trajectory changing rule.

8. The method of claim 1, after displaying the first annotation track above the first content of screen sharing,
wherein the displaying the first content of screen sharing and the first annotation track after performing the second request, further comprises:

obtaining the page number of the first content of screen sharing;

determining the first annotation track corresponding to the page number of the first content of screen sharing according to the first correspondence;

synchronously displaying the first annotation track when the first content of screen sharing is displayed.

9. A computing device for providing annotation track on paginated content to be displayed on a whiteboard, the computing device comprising: a computer readable storage medium, a display screen with a touch function, and one or more processors;

wherein the computer readable storage medium is configured to store at least one instruction;

the at least one instruction, when executed by the one or more processors, causes the whiteboard to:

receive, from a computing device, a first content and a page number associated with the first content;

display, in a first layer of the whiteboard, the first content of screen sharing on the display screen;

receive a first annotation command, wherein the first annotation command is used for annotating the first content of screen sharing;

display, in a second layer overlaying the first layer, a first annotation track above the first content of screen sharing, wherein the first annotation track is generated based on the first annotation command, and save a first correspondence between the first annotation track and the page number associated with the first content of screen sharing;

detect a first request to turn pages forward, and synchronously remove the first sharing content of screen sharing from the first layer and the first annotation track from the second layer, wherein the first request to turn pages forward is used for triggering the first content of screen sharing to turn forward;

display, in the first layer, a second content of screen sharing after performing the first request on the display screen;

detect a second request to turn pages backward, wherein the second request is used for controlling the second content of screen sharing to turn backward to the first content of screen sharing;

after performing the second request, synchronously display the first content of screen sharing and the first annotation track based on the saved first correspondence between the first annotation track and the page number associated with the first content;

obtain a controlling instruction of a variation generated by the computing device for the first content of screen sharing;

determine a position altering path of the first annotation track according to the controlling instruction and a screen mapping relation, wherein the screen mapping relation is determined according a resolution of a corresponding screen of the computing device and a resolution of the whiteboard; and update the first content of screen sharing based on the controlling instruction and synchronously updating the first annotation track according to the position altering path.

10. The computing device of claim 9, after display the second content of screen sharing after performing the first request on the display screen, wherein the at least one instruction when executed causes the computing device to:

receive a second annotation command, wherein the second annotation command is used for annotating the second content of screen sharing;

display a second annotation track above the second content of screen sharing, wherein the second annotation track is generated based on the second annotation command.

11. The computing device of claim 10, after display the first content of screen sharing and the first annotation track after performing the second request, wherein the at least one instruction when executed causes the computing device to:

detect an instruction to turn pages forward, wherein the instruction to turn pages forward is used for trigger the first content of screen sharing to turn forward to the second content of screen sharing;

display the second content of screen sharing and the second annotation track after executing the instruction.

12. The computing device of claim 9, after display the first annotation track above the first content of screen sharing, wherein the at least one instruction when executed causes the computing device to:

convert the first annotation track in user's handwriting into the annotation track in standard print formats;

display the annotation track in standard print formats as a substitute for the first annotation track in user's handwriting.

13. The computing device of claim 9, after display the first annotation track above the first content of screen sharing, wherein the at least one instruction when executed causes the computing device to:

analyze the first annotation track to obtain pixel point positions in the first annotation track;

obtain the corresponding image data in the first content of screen sharing, according to the pixel point positions in the first annotation track;

wherein the display the first content of screen sharing and the first annotation track after implementing the input, comprises:

display the first content of screen sharing, and track the image data during the display;

synchronously display the first annotation track according to a tracking result while maintaining a fixed relative position between the first annotation track and the image data.

14. The computing device of claim 13, after obtaining the corresponding image data in the first content of screen sharing, according to the pixel point positions in the first annotation track, wherein the at least one instruction when executed causes the computing device to:

save a second correspondence between the image data and the first annotation track;

wherein before display the first content of screen sharing and track the image data during the display, the at least one instruction when executed causes the computing device to:

obtain the corresponding image data in the first content of screen sharing;
determine the first annotation track corresponding to the image data according to the second correspondence.

15. The computing device of claim 9, after display the first content of screen sharing and the first annotation track after implementing the input, the at least one instruction when executed causes the computing device to:
    obtain a second controlling instruction of a variation on the first content of screen sharing;
    determine, according to the second controlling instruction of the variation, a trajectory changing rule for displaying the first annotation track;
    update the first content of screen sharing, and synchronously update the first annotation track according to the trajectory changing rule.

16. The computing device of claim 9, after display the first annotation track above the first content of screen sharing wherein the display the first content of screen sharing and the first annotation track after performing the second request, the at least one instruction when executed causes the computing device to:
    obtain the page number of the first content of screen sharing;
    determine the first annotation track corresponding to the page number of the first content of screen sharing according to the first correspondence;
    synchronously display the first annotation track when the first content of screen sharing is displayed.

17. A non-transitory readable storage medium having at least one executable instruction stored thereon, when executed by one or more processors of a computing device, causes a whiteboard to perform operations of providing annotation track on paginated content displayed on the whiteboard, the operations comprising:
    receiving, by the whiteboard from a computing device, a first content and a page number associated with the first content;
    displaying, in a first layer of the whiteboard, the first content of screen sharing;
    receiving, by the whiteboard, a first annotation command, wherein the first annotation command is used for annotating the first content of screen sharing;
    displaying, in a second layer overlaying the first layer, a first annotation track above the first content of screen sharing, wherein the first annotation track is generated based on the first annotation command, and saving a first correspondence between the first annotation track and the page number associated with the first content of screen sharing;
    detecting a first request to turn pages forward, and synchronously removing the first content of screen sharing from the first layer and the first annotation track from the second layer, wherein the first request to turn pages forward is used for triggering the first content of screen sharing to turn forward;
    displaying, in the first layer, a second content of screen sharing after performing the first request;
    detecting a second request to turn pages backward, wherein the second request is used for controlling the second content of screen sharing to turn backward to the first content of screen sharing;
    after performing the second request, synchronously displaying the first content of screen sharing and the first annotation track based on the saved first correspondence between the first annotation track and the page number associated with the first content;
    obtaining a controlling instruction of a variation generated by the computing device for the first content of screen sharing;
    determining a position altering path of the first annotation track according to the controlling instruction and a screen mapping relation, wherein the screen mapping relation is determined according a resolution of a corresponding screen of the computing device and a resolution of the whiteboard; and
    updating, on the whiteboard, the first content of screen sharing based on the controlling instruction and synchronously updating the first annotation track according to the position altering path.

18. The readable storage medium of claim 17, wherein the operations further comprise: after displaying the second content of screen sharing after performing the first request,
    receiving a second annotation command, wherein the second annotation command is used for annotating the second content of screen sharing;
    displaying a second annotation track above the second content of screen sharing, wherein the second annotation track is generated based on the second annotation command.

19. The readable storage medium of claim 18, wherein the operations further comprise: after displaying the first content of screen sharing and the first annotation track after performing the second request,
    detecting an instruction to turn pages forward, wherein the instruction to turn pages forward is used for trigger the first content of screen sharing to turn forward to the second content of screen sharing;
    displaying the second content of screen sharing and the second annotation track after executing the instruction.

20. The readable storage medium of claim 17, wherein the operations further comprise:
    analyzing the first annotation track to obtain pixel point positions in the first annotation track;
    obtaining the corresponding image data in the first content of screen sharing, according to the pixel point positions in the first annotation track;
    wherein the displaying the first content of screen sharing and the first annotation track after implementing the input, comprises:
    displaying the first content of screen sharing, and tracking the image data during the displaying;
    synchronously displaying the first annotation track according to a tracking result while maintaining a fixed relative position between the first annotation track and the image data.

\* \* \* \* \*